United States Patent
Bolton et al.

(10) Patent No.: US 12,218,314 B2
(45) Date of Patent: Feb. 4, 2025

(54) PHOSPHOROUS ELECTROLYTE ADDITIVES FOR AQUEOUS BATTERIES

(71) Applicant: OCTET SCIENTIFIC, INC., Cleveland, OH (US)

(72) Inventors: Onas James Bolton, Pepper Pike, OH (US); Emily Janine Dickens, Cleveland, OH (US); Mark Rubino, Holland, MI (US); Akash Kota, Cleveland, OH (US)

(73) Assignee: Octet Scientific, Inc., Cleveland, OH (US)

( * ) Notice: Subject to any disclaimer, the term of this patent is extended or adjusted under 35 U.S.C. 154(b) by 0 days.

(21) Appl. No.: 18/628,377

(22) Filed: Apr. 5, 2024

(65) Prior Publication Data
US 2024/0339670 A1 Oct. 10, 2024

Related U.S. Application Data

(60) Provisional application No. 63/495,020, filed on Apr. 7, 2023.

(51) Int. Cl.
*H01M 10/00* (2006.01)
*H01M 10/26* (2006.01)

(52) U.S. Cl.
CPC .... *H01M 10/26* (2013.01); *H01M 2300/0014* (2013.01)

(58) Field of Classification Search
CPC ............ H01M 4/382; H01M 10/0569; H01M 10/052; H01M 10/0435; H01M 10/0568; H01M 10/0567; H01M 2500/0034; H01M 2300/0037; Y02E 60/10
See application file for complete search history.

(56) References Cited

U.S. PATENT DOCUMENTS

| | | | |
|---|---|---|---|
| 8,277,973 B2 | 10/2012 | Kawashima | |
| 10,862,169 B2 | 12/2020 | Sato et al. | |
| 2019/0123390 A1* | 4/2019 | Xu | H01M 4/382 |

FOREIGN PATENT DOCUMENTS

| | | | | |
|---|---|---|---|---|
| CN | 117 624 470 A | | 3/2024 | |
| JP | 2008021624 A | * | 1/2008 | ........ H01M 10/0525 |
| JP | 2008041635 A | | 2/2008 | |
| JP | 2013152825 A | | 8/2013 | |
| JP | 2018 133258 A | | 8/2018 | |
| KR | 102068759 B1 | | 2/2020 | |
| WO | WO-2018221309 A1 | * | 12/2018 | ........ H01M 10/0567 |

OTHER PUBLICATIONS

Kawashima et al, Nonaqueous Electrolyte Composition and Nonaqueous Electrolyte Secondary Battery, Jan. 2008, See the Abstract. (Year: 2008).*
Fujita et al, Secondary Cell and Device Including Secondary Cell, Dec. 2018, See the Abstract. (Year: 2018).*
International search report and written opinion of PCT/US2024/023341 dated Oct. 22, 2024; 15 pages.
Han, Young-Kyu et al., "Computational screening of phosphite derivatives as high-performance additives in high-voltage Li-ion batteries", RSC Advances, vol. 7, No. 32, Jan. 1, 2017, pp. 20049-20056; DOI: 10.1039/C6RA28268G.
Jin, Chang-Soo et al., "Effect of organophosphorus compound additives for thermal stability on the positive electrolyte of a vanadium redox flow battery", Journal of Applied Electrochemistry, Springer, Dordrecht, NL, vol. 48, No. 9, Jun. 25, 2018, pp. 1019-1030; DOI: 10.1007/S10800-018-1227-X.

* cited by examiner

Primary Examiner — Anca Eoff
Assistant Examiner — Monique M Wills
(74) Attorney, Agent, or Firm — SQUIRE PATTON BOGGS (US)

(57) ABSTRACT

Provided herein are phosphorus battery electrolyte additive chemicals for use in aqueous batteries that prevent self-discharge in the form of corrosion and hydrogen evolution, which increases the efficiency and extends the shelf-life of the batteries.

20 Claims, No Drawings

PHOSPHOROUS ELECTROLYTE ADDITIVES FOR AQUEOUS BATTERIES

CROSS-REFERENCE TO RELATED APPLICATIONS

This application claims priority to, and the benefit of, U.S. Ser. No. 63/495,020 filed Apr. 7, 2023, the entirety of which is hereby incorporated by reference for all purposes.

FIELD

The present disclosure concerns phosphorous electrolyte additives for use in zinc batteries. The additives prevent self-discharge, corrosion, and hydrogen evolution. By doing so, the additives set forth herein increase coulombic efficiency, increase cycle life, and extend the shelf-life of the zinc batteries.

BACKGROUND

Zinc is non-toxic, inexpensive, and compatible with aqueous electrolytes. Zinc-based batteries are nonflammable and environmentally friendly. Zinc may evolve hydrogen gas when used in aqueous electrolyte batteries due to zinc electrode corrosion and self-discharge. This shortens battery shelf-life, reduces cycle efficiency and battery capacity, as well as increases internal pressure, which may cause mechanical failures. What is needed are compositions, including but not limited to aqueous electrolyte additives, and methods or making and using the same to, for example, reduce hydrogen evolution and corrosion in zinc-batteries.

SUMMARY

Provided herein are novel zinc-battery phosphorous electrolyte additive chemicals. It has been surprisingly discovered that the phosphorous electrolyte additives described herein, optionally at particular concentrations and combinations, mitigate hydrogen evolution in zinc batteries and result in batteries with improved coulombic efficiency, shelf-life, and safety.

Provided herein are aqueous electrolytes comprising at least one electrolyte additive of Formula I or Formula II:

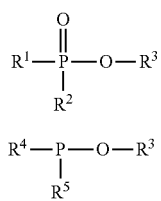

Formula I

Formula II or a salt thereof, anion thereof, hydrolytic product thereof, tautomer thereof, or an electrochemical reduction product thereof;
wherein
$R^1$ and $R^2$ are independently selected from hydrogen, —OH, $C_{1-20}$alkoxy, —$C_{1-6}$alkyl-C(O)O$R^6$, hydroxy$C_{1-6}$alkyl, $C_{6-10}$aryl, $C_{6-10}$aryl$C_{1-6}$alkyl, $C_{6-10}$aryloxy, and $C_{6-10}$aryl$C_{1-6}$alkoxy wherein the $C_{6-10}$aryl, either alone or as part of another group, is optionally substituted with at least one $R^7$;

$R^3$ is hydrogen, $C_{1-6}$alkyl, hydroxy$C_{1-6}$alkyl, $C_{6-10}$aryl, or $C_{6-10}$aryl$C_{1-6}$alkyl, wherein the $C_{6-10}$aryl or the $C_{6-10}$aryl$C_{1-6}$alkyl is optionally substituted with at least one $R^7$; or $R^1$ and $R^3$ together form a $C_{3-10}$heterocycle that contains at least the —P($R^2$)(O)O— group to which $R^1$ and $R^3$ are attached; wherein the $C_{3-10}$heterocycle is optionally substituted with at least one $R^7$ group; and/or the $C_{3-10}$heterocycle is optionally fused to one or two $C_{6-10}$aryl groups; or $R^1$, $R^2$, and $R^3$ together form a bridged $C_{3-10}$heterocycle that contains at least the —P(O)O— group to which $R^1$, $R^2$, and $R^3$ are attached wherein the $C_{3-10}$heterocycle is optionally substituted with at least one $R^7$ group;

$R^4$ and $R^5$ are independently selected from hydrogen, —OH, $C_{1-20}$alkoxy, —$C_{1-6}$alkyl-C(O)O$R^6$, hydroxy$C_{1-6}$alkyl, $C_{6-10}$aryl, $C_{6-10}$aryl$C_{1-6}$alkyl, $C_{6-10}$aryloxy, and $C_{6-10}$aryl$C_{1-6}$alkyloxy wherein the $C_{6-10}$aryl, either alone or as part of another group, is optionally substituted with at least one $R^7$; or $R^3$ and $R^4$ together form a $C_{3-10}$heterocycle that contains at least the —P($R^5$)O— group to which $R^3$ and $R^4$ are attached; wherein the $C_{3-10}$heterocycle is optionally substituted with at least one $R^7$ group; or $R^3$, $R^4$, and $R^5$ together form a bridged $C_{3-10}$heterocycle that contains at least the —P—O— group to which $R^3$, $R^4$, and $R^5$ are attached wherein the $C_{3-10}$heterocycle is optionally substituted with at least one $R^7$ group;

$R^6$ is hydrogen or $C_{1-6}$alkyl; and $R^7$ is independently selected from $C_{1-6}$alkyl, —OH, and hydroxy$C_{1-6}$alkyl, and wherein $R^7$ is not further substituted;

wherein the aqueous electrolyte optionally further comprises one or more ions selected from the group consisting of $Na^+$, $K^+$, $Ca^{2+}$, $Zn^{2+}$, a quaternary ammonium cation with a net positive charge of one, and combinations thereof; and wherein the at least one electrolyte additive is present in the aqueous electrolyte at a concentration equal to, or greater than, 0.001 weight percent (wt %) to less than, or equal to, 50 wt %.

In certain embodiments, the concentration of the electrolyte additive is the concentration of a single additive of Formula I, Formula II, Formula P-I, or Formula P-II, or a salt thereof, anion thereof, hydrolytic product thereof, or an electrochemical reduction product thereof. In certain embodiments, the concentration of the electrolyte additive is the concentration of a combination of additives of Formula I, Formula II, Formula P-I, and/or Formula P-II, or a salt thereof, anion thereof, hydrolytic product thereof, or electrochemical reduction product thereof.

In a preferred embodiment, the electrolyte additive or combination of electrolyte additives is present in the electrolyte at a concentration between about 0.001 wt % to 35 wt %. In one embodiment, the electrolyte additive or combination of electrolyte additives is present at a concentration between about 0.001 wt % and 10 wt %, between about 0.5 wt % and 5 wt %, between about 0.5 wt % and 1.5 wt %, between about 1 wt % and 2 wt %, or between about 0.001 wt % and 0.05 wt %. In a preferred embodiment, the electrolyte additive or combination of electrolyte additives is present in the electrolyte at a concentration of about 0.001 wt % to 35 wt %. In another preferred embodiment, the electrolyte additive or combination of electrolyte additives is present in the electrolyte at a concentration of about 0.001 wt % to 30 wt %. In one embodiment, the electrolyte additive or combination of electrolyte additives is present at a concentration of about 0.001 wt % and 10 wt %, of about 0.5 wt % and 5 wt %, of about 0.5 wt % and 1.5 wt %, of about 1 wt % and 2 wt %, or of about 0.001 wt % and 0.05 wt %. In one embodiment, the electrolyte additive or combination of electrolyte additives is present at a concentration of less than about 0.5 wt %. In one embodiment, the electrolyte additive or combination of electrolyte additives is present at a concentration of about 0.5 wt %. In one embodiment, the electrolyte additive or combination of electrolyte additives is present at a concentration of about 1 wt %. In one embodiment, the electrolyte additive or combination of electrolyte additives is present at a concentration of about 1.5 wt %. In one embodiment, the electrolyte additive or combination of electrolyte additives is present at a concentration of about 2 wt %.

In one embodiment, the aqueous electrolyte comprises two electrolyte additives and the concentration of each additive is between about 0.5 wt % and 5 wt %. In one embodiment, the aqueous electrolyte comprises two electrolyte additives and the combined concentration of the two additives is between about 0.5 wt % and 5 wt %.

In one embodiment, the aqueous electrolyte comprises two electrolyte additives and the concentration of each additive is between about 0.1 wt % and 1 wt %. In one embodiment, the aqueous electrolyte comprises two electrolyte additives and the combined concentration of the two additives is between about 0.1 wt % and 1 wt %.

In one embodiment, the aqueous electrolyte comprises two electrolyte additives and the concentration of each additive is between about 0.001 wt % and 0.5 wt %. In one embodiment, the aqueous electrolyte comprises two electrolyte additives and the combined concentration of the two additives is between about 0.001 wt % and 0.5 wt %.

In one embodiment, the electrolyte composition comprises an electrolyte additive of Formula IA, Formula IB, Formula IC, or Formula ID:

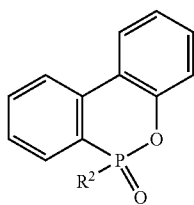

Formula IA

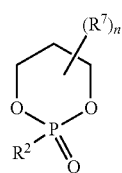

Formula IB

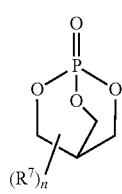

Formula IC

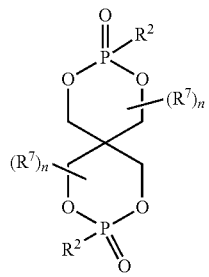

Formula ID wherein $R^2$ and $R^7$ are as defined herein and n is an integer selected from 0, 1, and 2.

In one embodiment, the electrolyte composition comprises an electrolyte additive of Formula IIA or Formula IIB:

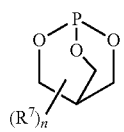

Formula IIA

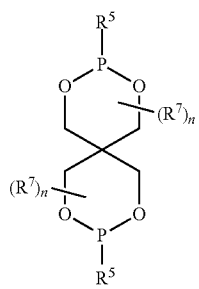

Formula IIB wherein $R^7$, $R^5$, and n are as defined herein.

The molecules disclosed herein exist in dynamic equilibrium with de-protonated analogs, in which the equilibrium constant is temperature dependent. For example, certain molecules have labile hydrogen ions (i.e., protons) and will exist in a thermodynamic equilibrium; the labile protons will associate and dissociate from the molecule. In basic electrolytes and certain acidic electrolytes, such as those often used with zinc batteries, the aforementioned battery additives may be present in the electrolyte in a deprotonated form. For example, under certain conditions, when $R^3$ is H, $R^3$ in Formula I and Formula II can exist as —O⁻ and not —OH to afford an additive of Formula I-1 and Formula II-1:

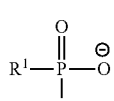

Formula I-1

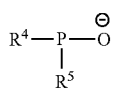

Formula II-1 wherein Formula I-1 or Formula II-1 optionally further comprise a cation selected from $Na^+$, $K^+$, $Zn^{2+}$, $Ca^{2+}$, and a quaternary ammonium cation with a net positive charge. In one embodiment, a compound of Formula I-1 comprises K⁺. In one embodiment, a compound of Formula II-1 comprises K⁺.

Further, under certain conditions, when $R^2$ is OH in Formula I-1 and $R^5$ is OH Formula II-1, $R^2$ and $R^5$ can exist as —O⁻ and not —OH to afford an additive of Formula I-2 and Formula II-2:

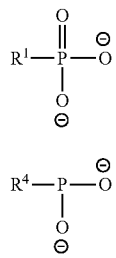

Formula I-2

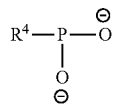

Formula II-2 wherein Formula I-2 or Formula II-2 optionally further comprise one or more cations selected from Na⁺, K⁺, Zn²⁺, Ca²⁺, and a quaternary ammonium cation with a net positive charge. In one embodiment, a compound of Formula I-2 comprises two Na⁺ cations. In one embodiment, a compound of Formula II-2 comprises two Na⁺ cations.

Further, under certain conditions, if $R^1$ and $R^2$ are OH in Formula I-1, $R^1$ and $R^2$ can both exist as —O⁻ and not —OH to afford an additive of Formula I-3. Similarly, if $R^4$ and $R^5$ are OH in Formula II-1, $R^4$ and $R^5$ can both exist as —O⁻ and not —OH to afford an additive of Formula II-3:

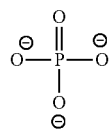

Formula I-3

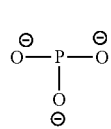

Formula II-3 wherein Formula I-3 or Formula II-3 optionally further comprise one or more cations selected from Na⁺, K⁺, Zn²⁺, Ca²⁺, and a quaternary ammonium cation with a net positive charge.

Similarly when $R^2$ is OH in Formula IA, Formula IB, or ID, $R^2$ can exist as —O— and not —OH to afford an additive of Formula IA-1, Formula IB-1, Formula ID-1, or ID-2:

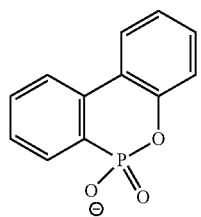

Formula IA-1

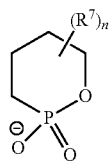

Formula IB-1

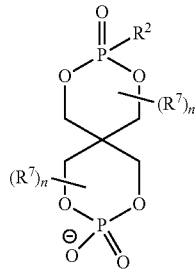

Formula ID-1

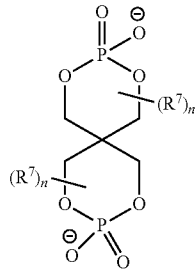

Formula ID-2 wherein Formula IA, Formula IB-1, Formula ID-1, or Formula ID-2 optionally further comprise one or more cations selected from Na⁺, K⁺, Zn²⁺, Ca²⁺, and a quaternary ammonium cation with a net positive charge.

When $R^5$ is OH in Formula IIB, $R^5$ can exist as —O⁻ and not —OH to afford an additive of Formula IIB-1 or Formula IIB-2:

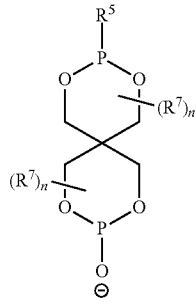

Formula IIB-1

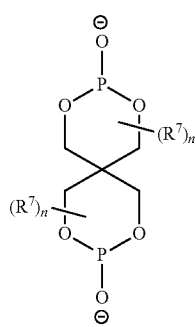

Formula IIB-2 wherein Formula IIB-1 or Formula IIB-2 optionally further comprise one or more cations selected from $Na^+$, $K^+$, $Zn^{2+}$, $Ca^{2+}$, and a quaternary ammonium cation with a net positive charge.

In some embodiments of any of the electrolyte additives described herein, the cation is $K^+$. In an alternative embodiment of any of the electrolyte additives described herein, the cation is any suitable cation that does not react with the electrolyte additive, including for example, $H^+$ and $Li^+$.

Optionally substituted substituents (e.g., $R^1$, $R^2$, $R^3$, $R^4$, $R^5$, $R^6$, or $R^7$) are unsubstituted unless explicitly stated otherwise.

In the embodiments described herein, the bond represented by

is the point of attachment to the rest of the compound.

In another example, set forth herein is a battery or electrochemical cell comprising at least one phosphorus electrolyte additive described herein. In certain embodiments, the battery comprises a zinc anode. Herein a phosphorus electrolyte additive includes a compound having at least one or more phosphorus atoms. The phosphorus atoms may be arranged and bonded in a variety of manners. In some embodiments, sets forth herein are compounds having phosphate functional groups. In some embodiments, sets forth herein are compounds having phosphonate functional groups. In some embodiments, sets forth herein are compounds having phosphinic functional groups. In some embodiments, sets forth herein are compounds having both phosphate and a phosphonate functional groups.

In another example, set forth herein is a process for making a zinc battery, comprising contacting an electrolyte having a phosphorus electrolyte additive described herein with a zinc-battery electrode.

In another example, set forth herein is a method of using a zinc battery, comprising electrochemically cycling a zinc-battery comprising an electrolyte having a phosphorus electrolyte additive set forth herein.

In another example, set forth herein is a method of reducing or eliminating self-discharge and/or preventing hydrogen production comprising (a) providing an electrochemical cell comprising a zinc-lithium, zinc-carbon, zinc-chloride, zinc-bromide, zinc-air, zinc-iron, zinc-manganese dioxide, zinc-iodide, zinc-nickel, or zinc-silver oxide anode-cathode; and (b) an aqueous electrolyte comprising KOH and at least one phosphorus electrolyte additive described herein.

DETAILED DESCRIPTION

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the disclosure herein is not intended to be limited to the embodiments presented, but are to be accorded their widest scope consistent with the principles and novel features disclosed herein.

All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Please note, if used, the labels left, right, front, back, top, bottom, forward, reverse, clockwise and counterclockwise have been used for convenience purposes only and are not intended to imply any particular fixed direction. Instead, they are used to reflect relative locations and/or directions between various portions of an object.

I. DEFINITIONS

As used herein, the singular forms "a," "an" and "the" include plural referents unless the context clearly dictates otherwise.

As used herein, the term "about," when qualifying a number, e.g., 15% w/w, refers to the number qualified and optionally the numbers included in a range about that qualified number that includes ±10% of the number. For example, about 15% w/w includes 15% w/w as well as 13.5% w/w, 14% w/w, 14.5% w/w, 15.5% w/w, 16% w/w, or 16.5% w/w.

As used herein, "selected from the group consisting of" refers to a single member from the group, more than one member from the group, or a combination of members from the group. A member selected from the group consisting of A, B, and C includes, for example, A only, B only, or C only, as well as A and B, A and C, B and C, as well as A, B, and C.

As used herein, zinc may be referred to by its IUPAC chemical symbol, Zn.

As used herein, "aqueous electrolyte" is an electrolyte wherein water is the solvent.

As used herein, "alkyl" refers to a monovalent and saturated hydrocarbon radical moiety. Alkyl is optionally substituted and can be linear, branched, or cyclic, i.e., cycloalkyl. Alkyl includes, but is not limited to, those having 1-10 carbon atoms, i.e., $C_{1-10}$ alkyl, or 1-6 carbon atoms, i.e., $C_{1-6}$ alkyl. In other embodiments, alkyl includes, but is not limited to, having 1-20 carbon atoms, i.e., $C_{1-20}$ alkyl. Examples of alkyl moieties include, but are not limited to methyl, ethyl, n-propyl, i-propyl, n-butyl, s-butyl, t-butyl, i-butyl, a pentyl moiety, a hexyl moiety, cyclopropyl, cyclobutyl, cyclopentyl, and cyclohexyl. In one embodiment, alkyl is linear. In one embodiment, alkyl is branched.

As used herein, "alkoxy" refers to the group —OR' wherein R' is alkyl. Alkoxy groups include, but are not limited to, methoxy, ethoxy, n-propoxy, isopropoxy, n-butoxy, tert-butoxy, and sec-butoxy. Alkoxy includes, but is not limited to, those having 1-20 carbon atoms, i.e., $C_{1-20}$ alkoxy, 1-10 carbon atoms, i.e., $C_{1-10}$ alkoxy. or 1-6 carbon atoms, i.e., $C_{1-6}$ alkoxy.

As used herein, "aryloxy" refers to the group —OR" wherein R" is aryl.

As used herein, "aryl" refers to a monovalent moiety that is a radical of an aromatic compound wherein the ring atoms are carbon atoms. Aryl is optionally substituted and can be monocyclic or polycyclic, e.g., bicyclic or tricyclic. Examples of aryl moieties include, but are not limited to, those having 6 to 20 ring carbon atoms, i.e., $C_{6-20}$ aryl; 6 to 15 ring carbon atoms, i.e., $C_{6-15}$ aryl, and 6 to 10 ring carbon atoms, i.e., $C_{6-10}$ aryl. Examples of aryl moieties include, but are limited to, phenyl, naphthyl, fluorenyl, azulenyl, anthryl, phenanthryl, and pyrenyl.

As used herein, "arylalkoxy" refers to an alkoxy group, as used herein, substituted with an aryl group, as defined herein.

As used herein, "arylalkyl" refers to an alkyl group, as used herein, substituted with an aryl group, as defined herein. "Bn" or "benzyl" refers to "$CH_2$-phenyl."

As used herein, "heterocycloalkyl" or "heterocycle" refers to a cycloalkyl in which one or more carbon atoms are replaced by heteroatoms. Suitable heteroatoms include, but are not limited to, nitrogen, oxygen, sulfur, and phosphorus. Heterocycloalkyl is optionally substituted. Examples of heterocycloalkyl moieties include, but are not limited to, 1,2-oxaphosphinane 2-oxide and 2,6,7-trioxa-1-phosphabicyclo[2.2.2]octane 1-oxide. Additional examples of heterocycloalkyl include morpholinyl, piperidinyl, tetrahydropyranyl, pyrrolidinyl, imidazolidinyl, oxazolidinyl, thiazolidinyl, dioxolanyl, dithiolanyl, oxanyl, or thianyl. In certain embodiments, the heterocycle is fused, for example to an aryl group or another heterocycle group. In certain embodiments, the heterocycle is a monovalent, monocyclic, or multicyclic fully-saturated ring system. In certain embodiments, the heterocycle group may be unsaturated, and/or bridged, and/or a fused bicyclic group, and/or a spirocyclic bicyclic group. The term "spiro bicyclic group" refers to a bicyclic heterocycloalkyl ring system in which 2 or 3 rings are linked together by one common atom. In some embodiments, a spiro bicyclic ring is a 3- to 10-membered spirocyclic bicyclic heterocycle comprising at least one, and preferably two, —O—P(O)(OR$^2$)O— bonds. In some embodiments, a spiro bicyclic ring is a 3- to 10-membered spirocyclic bicyclic heterocycle comprising at least one, and preferably two, —O—P(OR$^5$)O— bonds. The term "bridged bicyclic ring system" refers to a bicyclic heterocycloalkyl ring system in which the rings are bridged.

As used herein, "hydroxyalkyl" is an alkyl group, as used herein, substituted with at least one hydroxyl group.

As used herein, "halogen" and "halo" refer to chloro, bromo, iodo, or fluoro.

As used herein, "optionally substituted," when used to describe a radical moiety, e.g., optionally substituted alkyl, means that such moiety is optionally bonded to one or more substituents. Examples of such substituents include, but are not limited to halo, cyano, nitro, haloalkyl, azido, epoxy, optionally substituted heteroaryl, optionally substituted heterocycloalkyl,

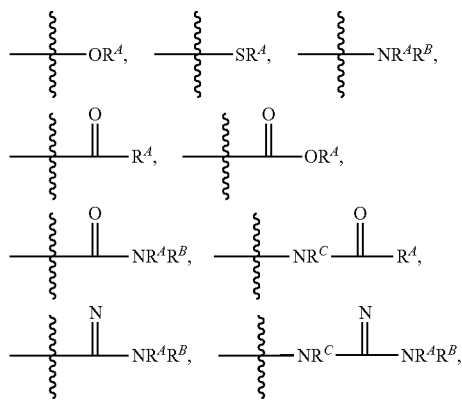

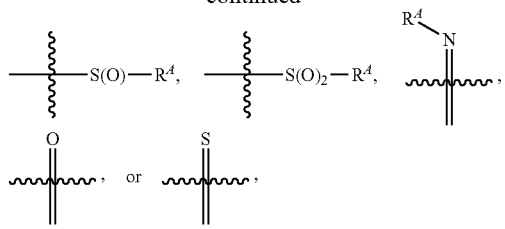

wherein R$^A$, R$^B$, and R$^C$ are, independently at each occurrence, a hydrogen atom, alkyl, alkenyl, alkynyl, aryl, alkaryl, aralkyl, heteroalkyl, heteroaryl, or heterocycloalkyl, or R$^A$ and R$^B$, together with the atoms to which they are bonded, form a saturated or unsaturated carbocyclic ring, wherein the ring is optionally substituted and wherein one or more ring atoms is optionally replaced with a heteroatom. In certain embodiments, when a radical moiety is optionally substituted with an optionally substituted heteroaryl, optionally substituted heterocycloalkyl, or optionally substituted saturated or unsaturated carbocyclic ring, the substituents on the optionally substituted heteroaryl, optionally substituted heterocycloalkyl, or optionally substituted saturated or unsaturated carbocyclic ring, if they are substituted, are not substituted with substituents which are further optionally substituted with additional substituents. In some embodiments, when a group described herein (e.g., R$^1$, R$^2$, R$^3$, R$^4$, and R$^5$) is optionally substituted, the substituent bonded to the group is unsubstituted unless otherwise specified.

As used here, "a phosphorus electrolyte additive" is an aqueous electrolyte additive chemical that comprises at least one or more phosphate, phosphite, phosphonate, phosphine, phosphinic acid, or phosphonic acid function group.

II. ELECTROLYTES

Set forth herein are phosphorus electrolyte additives that are particularly useful in aqueous electrolytes in zinc batteries. Zinc batteries includes zinc-air batteries as well as other types of zinc batteries. In some examples the aqueous electrolytes contemplated herein are neutral (with respect to pH). In preferred examples, the aqueous electrolytes contemplated herein are basic (with respect to pH). One example of a basic electrolyte is a zinc-air battery. In addition, the electrolytes set forth herein may be used in zinc-manganese oxide batteries, nickel-zinc batteries, silver-zinc batteries, or zinc-lithium batteries. In certain embodiments, the pH of the aqueous electrolyte is basic with a pH of greater than about 7, for example greater than about 8, greater than about 9, greater than about 10, greater than about 11, greater than about 12, or greater than about 13. In certain embodiments, the pH of the aqueous electrolyte is about 8 to 13. In certain embodiments, the pH of the aqueous electrolyte is greater than 14. In certain embodiments, the pH of the aqueous electrolyte is about 10. In certain embodiments, including any of the foregoing, the aqueous electrolyte comprises potassium hydroxide (KOH). In certain embodiments, including any of the foregoing, the aqueous electrolyte comprises zinc (II) sulfate.

In one embodiment, the aqueous electrolyte comprises at least one electrolyte additive of Formula P-I or Formula P-II:

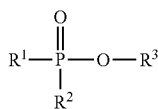

Formula P-I

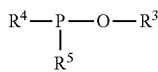

Formula P-II or a salt thereof, anion thereof, hydrolytic product thereof, or electrochemical reduction product thereof;

wherein $R^1$ and $R^2$ are independently selected from hydrogen, —OH, $C_{1-6}$alkoxy, —$CH_2C(O)OR^6$, hydroxy$C_{1-6}$alkyl, $C_{6-10}$aryl, $C_{6-10}$aryl$C_{1-6}$alkyl, $C_{6-10}$aryloxy, and $C_{6-10}$aryl$C_{1-6}$alkoxy wherein the $C_{6-10}$aryl, either alone or as part of another group, is optionally substituted with at least one $R^7$;

$R^3$ is hydrogen, $C_{1-6}$alkyl, hydroxy$C_{1-6}$alkyl, $C_{6-10}$aryl, or $C_{6-10}$aryl$C_{1-6}$alkyl, wherein the $C_{6-10}$aryl or the $C_{6-10}$aryl$C_{1-6}$alkyl is optionally substituted with at least one $R^7$; or $R^1$ and $R^3$ together form a $C_{3-10}$heterocycle that contains at least one oxygen atom;
   wherein the $C_{3-10}$heterocycle is optionally substituted with at least one $R^7$ group; and/or
   the $C_{3-10}$heterocycle is optionally fused to one or two $C_{6-10}$aryl groups; or $R^1$, $R^2$, and $R^3$ together form a bridged $C_{3-10}$heterocycle that contains at least one oxygen atom and wherein the $C_{3-10}$heterocycle is optionally substituted with at least one $R^7$ group;

$R^4$ and $R^5$ are independently selected from hydrogen, —OH, $C_{1-6}$alkoxy, —$CH_2C(O)OR^6$, hydroxy$C_{1-6}$alkyl, $C_{6-10}$aryl, $C_{6-10}$aryl$C_{1-6}$alkyl, $C_{6-10}$aryloxy, or $C_{6-10}$aryl$C_{1-6}$alkyloxy wherein the $C_{6-10}$aryl, either alone or as part of another group, is optionally substituted with at least one $R^7$;

$R^6$ is hydrogen or $C_{1-6}$alkyl; and $R^7$ is independently selected from $C_{1-6}$alkyl and hydroxy$C_{1-6}$alkyl, and wherein $R^7$ is not further substituted;
   wherein the aqueous electrolyte further comprises an ion selected from the group consisting of $Na^+$, $K^+$, $Ca^{2+}$, $Zn^{2+}$, a quaternary ammonium cation with a net positive charge of one, and combinations thereof; and
wherein the at least one electrolyte additive is present in the aqueous electrolyte at a concentration equal to, or greater than, 0.001 weight percent (wt %) to less than, or equal to, 50 wt %.

Formula I, Formula II, Formula P-I, and Formula P-II set forth herein are drawn as a neutrally charged molecules. However, molecules disclosed herein exist in dynamic equilibrium with de-protonated analogs, in which the equilibrium constant is temperature dependent. For example, certain molecules have labile hydrogen ions (i.e., protons) and will exist in a thermodynamic equilibrium; the labile protons will associate and dissociate from the molecule. In basic electrolytes, such as those often used with zinc batteries, the aforementioned battery additives may be present in the electrolyte in a deprotonated form. For example, the following electrolyte additives may be present in place of, or in addition to, the conjugate bases illustrated above.

In some embodiments, including any of the foregoing, set forth herein is an aqueous electrolyte comprising at least one electrolyte additive of Formula I, Formula II, Formula P-I, or Formula P-II or a salt thereof.

In some embodiments, including any of the foregoing, set forth herein is an aqueous electrolyte comprising at least one electrolyte additive of Formula I, Formula II, Formula P-I, or Formula P-II or anion thereof.

In some embodiments, including any of the foregoing, set forth herein is an aqueous electrolyte comprising at least one electrolyte additive of Formula I, Formula II, Formula P-I, or Formula P-II or hydrolytic product thereof.

In some embodiments, including any of the foregoing, set forth herein is an aqueous electrolyte comprising at least one electrolyte additive of Formula I, Formula II, Formula P-I, or Formula P-II or an electrochemical reduction product thereof.

For example, in certain embodiments, the additive of Formula I or Formula P-I is selected from a compound of Formula I-1:

Formula I-1 wherein Formula I-1 optionally further comprises a cation selected from $Na^+$, $K^+$, a quaternary ammonium cation with a net positive charge of one, $Zn^{2+}$ and $Ca^{2+}$. In one embodiment, the cation is $K^+$.

In certain embodiments, the additive of Formula II or Formula P-II is selected from a compound of Formula II-1:

Formula II-1 wherein Formula II-1 optionally further comprises a cation selected from $Na^+$, $K^+$, a quaternary ammonium cation with a net positive charge of one, $Zn^{2+}$ and $Ca^{2+}$. In one embodiment, the cation is $K^+$.

Further, in certain embodiments, the additive of Formula I or Formula P-I is selected from a compound of Formula I-2 or the additive of Formula II or Formula P-II is selected from an additive of Formula II-2:

Formula I-2

Formula II-2 wherein Formula I-2 or Formula II-2 optionally further comprise one or more cations selected from $Na^+$, $K^+$, $Zn^{2+}$, $Ca^{2+}$, and a quaternary ammonium cation with a net positive charge. In one embodiment, the one or more cations is $Na^+$.

In one embodiment, the aqueous electrolyte comprises one or more compounds selected from a compound of Formula I or Formula P-I or a salt thereof, anion thereof, hydrolytic product thereof, or electrochemical reduction product thereof; a compound of Formula I-1 or a salt thereof, hydrolytic product thereof, or electrochemical reduction product thereof; and, a compound of Formula I-2 or a salt thereof, hydrolytic product thereof, or electrochemical reduction product thereof.

In one embodiment, the aqueous electrolyte comprises one or more compounds selected from a compound of Formula II or Formula P-II or a salt thereof, anion thereof, hydrolytic product thereof, or electrochemical reduction product thereof; a compound of Formula II-1 or a salt thereof, hydrolytic product thereof, or electrochemical reduction product thereof; and, a compound of Formula II-2 or a salt thereof, hydrolytic product thereof, or electrochemical reduction product thereof.

In one embodiment, the aqueous electrolyte comprises a compound of Formula I or Formula P-I or a salt thereof, anion thereof, hydrolytic product thereof, or electrochemical reduction product thereof and a compound of Formula II or Formula P-II or a salt thereof, anion thereof, hydrolytic product thereof, or electrochemical reduction product thereof.

In one embodiment, the aqueous electrolyte comprises two or more compounds selected from (a) a compound of Formula I of Formula P-I or a salt thereof, anion thereof, hydrolytic product thereof, or an electrochemical reduction product thereof; (b) a compound of Formula II or Formula P-II or a salt thereof, anion thereof, hydrolytic product thereof, or an electrochemical reduction product thereof; (c) a compound of Formula I-1 or a salt thereof, hydrolytic product thereof, or an electrochemical reduction product thereof; (d) a compound of Formula II-1 or a salt thereof, hydrolytic product thereof, or an electrochemical reduction product thereof; (e) a compound of Formula I-2 or a salt thereof, hydrolytic product thereof, or an electrochemical reduction product thereof; and, (f) a compound of Formula II-2 or a salt thereof, hydrolytic product thereof, or an electrochemical reduction product thereof.

In one embodiment of Formula I, Formula II, Formula P-I, or Formula P-II, including any of the foregoing, $R^3$ is hydrogen or $C_{1-6}$alkyl. In one embodiment of Formula I, Formula II, Formula P-I, or Formula P-II, including any of the foregoing, $R^3$ is hydrogen. In one embodiment of Formula I, Formula II, Formula P-I, or Formula P-II, including any of the foregoing, $R^3$ is $C_{1-6}$alkyl. In one embodiment of Formula I, Formula II, Formula P-I, or Formula P-II, including any of the foregoing, $R^3$ is methyl or ethyl. In one embodiment of Formula I, Formula II, Formula P-I, or Formula P-II, including any of the foregoing, $R^3$ is $C_{6-10}$aryl or $C_{6-10}$aryl$C_{1-6}$alkyl, wherein the $C_{6-10}$aryl or the $C_{6-10}$aryl$C_{1-6}$alkyl is optionally substituted with at least one $R^7$. In one embodiment of Formula I, Formula II, Formula P-I, or Formula P-II, including any of the foregoing, $R^3$ is unsubstituted $C_{6-10}$aryl or $C_{6-10}$aryl$C_{1-6}$alkyl. In one embodiment of Formula I or Formula II, including any of the foregoing, $R^3$ is hydroxy$C_{1-6}$alkyl.

In one embodiment of Formula I, Formula P-I, Formula I-1, or Formula I-2, including any of the foregoing, $R^1$ is hydrogen. In one embodiment of Formula I, Formula P-I, Formula I-1, or Formula I-2, including any of the foregoing, $R^1$ is $C_{1-6}$alkoxy. In one embodiment of Formula I, Formula I-1, or Formula I-2, including any of the foregoing, $R^1$ is $C_{1-20}$alkoxy. In one embodiment of Formula I, Formula I-1, or Formula I-2, including any of the foregoing, $R^1$ is $C_{10-20}$alkoxy. In one embodiment of Formula I, Formula I-1, or Formula I-2, including any of the foregoing, $R^1$ is $C_{15-20}$alkoxy. In one embodiment of Formula I, Formula I-1, or Formula I-2, including any of the foregoing, $R^1$ is $C_{17}$alkoxy. In one embodiment of Formula I, Formula I-1, or Formula I-2, including any of the foregoing, $R^1$ is —$C_{1-6}$alkyl-C(O)OR$^6$. In one embodiment of Formula I, Formula P-I, Formula I-1, or Formula I-2, including any of the foregoing, $R^1$ is —$CH_2C(O)OR^6$. In one embodiment of Formula I, Formula P-I, Formula I-1, or Formula I-2, including any of the foregoing, $R^1$ is —$CH_2CH_2C(O)OR^6$. In one embodiment of Formula I, Formula P-I, Formula I-1, or Formula I-2, including any of the foregoing, $R^1$ is —$CH_2C(O)OH$. In one embodiment of Formula I, Formula I-1, or Formula I-2, including any of the foregoing, $R^1$ is —$CH_2CH_2C(O)OH$. In one embodiment of Formula I, Formula P-I, Formula I-1, or Formula I-2, including any of the foregoing, $R^1$ is —$CH_2C(O)OC_{1-6}$alkyl. In one embodiment of Formula I, Formula P-I, Formula I-1, or Formula I-2, including any of the foregoing, $R^1$ is —$CH_2C(O)OCH_3$. In one embodiment of Formula I, Formula I-1, or Formula I-2, including any of the foregoing, $R^1$ is —$CH_2CH_2C(O)CH_3$. In one embodiment of Formula I, Formula P-I, Formula I-1, or Formula I-2, including any of the foregoing, $R^1$ is hydroxy$C_{1-6}$alkyl.

In one embodiment of Formula I, Formula P-I, Formula I-1, or Formula I-2, including any of the foregoing, $R^1$ is unsubstituted $C_{6-10}$aryl. In one embodiment of Formula I, Formula P-I, Formula I-1, or Formula I-2, including any of the foregoing, $R^1$ is $C_{6-10}$aryl optionally substituted with one $R^7$. In one embodiment of Formula I, Formula P-I, Formula I-1, or Formula I-2, including any of the foregoing, $R^1$ is $C_{6-10}$aryl optionally substituted with one $C_{1-6}$alkyl. In one embodiment of Formula I, Formula P-I, Formula I-1, or Formula I-2, including any of the foregoing, $R^1$ is $C_{6-10}$aryl optionally substituted with one methyl group. In one embodiment of Formula I, Formula P-I, Formula I-1, or Formula I-2, including any of the foregoing, $R^1$ is unsubstituted phenyl. In one embodiment of Formula I, Formula P-I, Formula I-1, or Formula I-2, including any of the foregoing, $R^1$ is phenyl substituted with one methyl group. In one embodiment of Formula I, Formula P-I, Formula I-1, or Formula I-2, including any of the foregoing, $R^1$ is phenyl substituted with one methyl group in the para position.

In one embodiment of Formula I, Formula P-I, Formula I-1, or Formula I-2, including any of the foregoing, $R^1$ is $C_{6-10}$aryl$C_{1-6}$alkyl wherein the aryl group is optionally substituted with at least one $R^7$. In one embodiment of Formula I, Formula P-I, Formula I-1, or Formula I-2, including any of the foregoing, $R^1$ is $C_{6-10}$aryloxy wherein the aryl group is optionally substituted with at least one $R^7$. In one embodiment of Formula I, Formula P-I, Formula I-1, or Formula I-2, including any of the foregoing, $R^1$ is $C_{6-10}$aryl$C_{1-6}$alkoxy wherein the aryl group is optionally substituted with at least one $R^7$.

In one embodiment of Formula I, Formula P-I, or Formula I-1, including any of the foregoing, $R^2$ is hydrogen. In one embodiment of Formula I, Formula P-I, or Formula I-1, including any of the foregoing, $R^2$ is $C_{1-6}$alkoxy. In one embodiment of Formula I, Formula I-1, or Formula I-2, including any of the foregoing, $R^2$ is $C_{1-20}$alkoxy. In one embodiment of Formula I, Formula I-1, or Formula I-2, including any of the foregoing, $R^2$ is $C_{10-20}$alkoxy. In one embodiment of Formula I, Formula I-1, or Formula I-2, including any of the foregoing, $R^2$ is $C_{15-20}$alkoxy. In one embodiment of Formula I, Formula I-1, or Formula I-2, including any of the foregoing, $R^2$ is $C_{17}$alkoxy. In one embodiment of Formula I, Formula I-1, or Formula I-2, including any of the foregoing, $R^2$ is —$C_{1-6}$alkyl-C(O)OR$^6$. In one embodiment of Formula I, Formula P-I, or Formula I-1, including any of the foregoing, $R^2$ is —CH$_2$C(O)OR$^6$. In one embodiment of Formula I, Formula P-I, Formula I-1, or Formula I-2, including any of the foregoing, $R^2$ is —CH$_2$CH$_2$C(O)OR$^6$. In one embodiment of Formula I, Formula P-I, or Formula I-1, including any of the foregoing, $R^2$ is —CH$_2$C(O)OH. In one embodiment of Formula I, Formula I-1, or Formula I-2, including any of the foregoing, $R^2$ is —CH$_2$CH$_2$C(O)OH. In one embodiment of Formula I, Formula P-I, or Formula I-1, including any of the foregoing, $R^2$ is —CH$_2$C(O)OC$_{1-6}$alkyl. In one embodiment of Formula I, Formula P-I, or Formula I-1, including any of the foregoing, $R^2$ is —CH$_2$C(O)OCH$_3$. In one embodiment of Formula I, Formula I-1, or Formula I-2, including any of the foregoing, $R^2$ is —CH$_2$CH$_2$C(O)CH$_3$. In one embodiment of Formula I, Formula P-I, or Formula I-1, including any of the foregoing, $R^2$ is hydroxyC$_{1-6}$alkyl.

In one embodiment of Formula I, Formula P-I, or Formula I-1, including any of the foregoing, $R^2$ is unsubstituted $C_{6-10}$aryl. In one embodiment of Formula I, Formula P-I, or Formula I-1, including any of the foregoing, $R^2$ is $C_{6-10}$aryl optionally substituted with one $R^7$. In one embodiment of Formula I, Formula P-I, or Formula I-1, including any of the foregoing, $R^2$ is $C_{6-10}$aryl optionally substituted with one $C_{1-6}$alkyl. In one embodiment of Formula I, Formula P-I, or Formula I-1, including any of the foregoing, $R^2$ is $C_{6-10}$aryl optionally substituted with one methyl group. In one embodiment of Formula I, Formula P-I, or Formula I-1, including any of the foregoing, $R^2$ is unsubstituted phenyl. In one embodiment of Formula I, Formula P-I, or Formula I-1, including any of the foregoing, $R^2$ is phenyl substituted with one methyl group. In one embodiment of Formula I, Formula P-I, or Formula I-1, including any of the foregoing, $R^2$ is phenyl substituted with one methyl group in the para position.

In one embodiment of Formula I, Formula P-I, or Formula I-1, including any of the foregoing, $R^2$ is $C_{6-10}$arylC$_{1-6}$alkyl wherein the aryl group is optionally substituted with at least one $R^7$. In one embodiment of Formula I, Formula P-I, or Formula I-1, including any of the foregoing, $R^2$ is $C_{6-10}$aryloxy wherein the aryl group is optionally substituted with at least one $R^7$. In one embodiment of Formula I, Formula P-I, or Formula I-1, including any of the foregoing, $R^2$ is $C_{6-10}$arylC$_{1-6}$alkoxy wherein the aryl group is optionally substituted with at least one $R^7$.

In one embodiment of Formula I, or Formula I-1, including any of the foregoing, $R^1$ and $R^2$ are independently selected from hydrogen, —OH, $C_{1-6}$alkoxy, $C_{6-10}$aryl, and —$C_{1-6}$alkyl-C(O)OR$^6$ wherein the $C_{6-10}$aryl group is optionally substituted with $C_{1-6}$alkyl. In one embodiment of Formula I, Formula P-I, or Formula I-1, including any of the foregoing, $R^1$ and $R^2$ are independently selected from hydrogen, —OH, $C_{1-6}$alkoxy, $C_{6-10}$aryl, and —CH$_2$C(O)OR$^6$ wherein the $C_{6-10}$aryl group is optionally substituted with $C_{1-6}$alkyl. In one embodiment of Formula I, or Formula I-1, including any of the foregoing, $R^1$ and $R^2$ are independently selected from hydrogen, —OH, $C_{1-6}$alkoxy, $C_{6-10}$aryl, and —$C_{1-6}$alkyl-C(O)OR$^6$ wherein the $C_{6-10}$aryl group is optionally substituted with $C_{1-6}$alkyl. In one embodiment of Formula I, Formula P-I, or Formula I-1, $R^1$ and $R^2$ are independently selected from hydrogen, $C_{1-6}$alkoxy, $C_{6-10}$aryl, and —CH$_2$C(O)OR$^6$ wherein the $C_{6-10}$aryl group is optionally substituted with $C_{1-6}$alkyl. In one embodiment of Formula I, or Formula I-1, $R^1$ and $R^2$ are independently selected from hydrogen, $C_{1-6}$alkoxy, $C_{6-10}$aryl, and —$C_{1-6}$alkyl-C(O)OR$^6$ wherein the $C_{6-10}$aryl group is optionally substituted with $C_{1-6}$alkyl. In one embodiment of Formula I, Formula P-I, or Formula I-1, including any of the foregoing, $R^1$ and $R^2$ are independently selected from hydrogen, —OH, $C_{1-6}$alkoxy, and $C_{6-10}$aryl wherein the $C_{6-10}$aryl group is unsubstituted. In one embodiment of Formula I, Formula P-I, or Formula I-1, including any of the foregoing, $R^1$ and $R^2$ are independently selected from hydrogen, —OH, and $C_{6-10}$aryl wherein the $C_{6-10}$aryl group is unsubstituted.

In one embodiment of Formula I, Formula P-I, or Formula I-1, including any of the foregoing, $R^1$ and $R^2$ are both $C_{1-6}$alkoxy or are both $C_{6-10}$aryl. In one embodiment of Formula I, Formula P-I, or Formula I-1, including any of the foregoing, $R^1$ and $R^2$ are both $C_{1-6}$alkoxy. In one embodiment of Formula I, Formula P-I, or Formula I-1, including any of the foregoing, $R^1$ and $R^2$ are both $C_{1-20}$alkoxy. In one embodiment of Formula I, Formula P-I, or Formula I-1, including any of the foregoing, $R^1$ and $R^2$ are both $C_{10-20}$alkoxy. In one embodiment of Formula I, Formula P-I, or Formula I-1, including any of the foregoing, $R^1$ and $R^2$ are both $C_{15-20}$alkoxy. In one embodiment of Formula I, Formula P-I, or Formula I-1, including any of the foregoing, $R^1$ and $R^2$ are both $C_{17}$alkoxy. In one embodiment of Formula I, Formula P-I, or Formula I-1, including any of the foregoing, $R^1$ and $R^2$ are both methoxy. In one embodiment of Formula I, Formula P-I, or Formula I-1, including any of the foregoing, $R^1$ and $R^2$ are both ethoxy. In one embodiment of Formula I, Formula P-I, or Formula I-1, including any of the foregoing, $R^1$ and $R^2$ are both unsubstituted $C_{6-10}$aryl. In one embodiment of Formula I, Formula P-I, or Formula I-1, including any of the foregoing, $R^1$ and $R^2$ are both $C_{6-10}$aryl optionally substituted with one $R^7$ group.

In one embodiment of Formula I, Formula P-I, or Formula I-1, including any of the foregoing, $R^1$ is hydrogen and $R^2$ is $C_{6-10}$aryl optionally substituted with one $R^7$ group. In one embodiment of Formula I, Formula P-I, or Formula I-1, including any of the foregoing, $R^1$ is hydrogen and $R^2$ is unsubstituted $C_{6-10}$aryl. In one embodiment of Formula I, Formula P-I, or Formula I-1, including any of the foregoing, $R^1$ is hydrogen and $R^2$ is unsubstituted phenyl. In one embodiment of Formula I, Formula P-I, or Formula I-1, including any of the foregoing, $R^1$ is hydrogen and $R^2$ is $C_{6-10}$aryl optionally substituted with one $C_{1-6}$alkyl group. In one embodiment of Formula I, Formula P-I, or Formula I-1, including any of the foregoing, $R^1$ is hydrogen and $R^2$ is $C_{6-10}$aryl optionally substituted with one methyl group. In one embodiment of Formula I, Formula P-I, or Formula I-1, including any of the foregoing, $R^1$ is hydrogen and $R^2$ is phenyl optionally substituted with one methyl group in the para position.

In one embodiment of Formula I, Formula P-I, or Formula I-1, including any of the foregoing, $R^1$ is hydroxy and $R^2$ is $C_{6-10}$aryl optionally substituted with one $R^7$ group. In one embodiment of Formula I, Formula P-I, or Formula I-1, including any of the foregoing, $R^1$ is hydroxy and $R^2$ is unsubstituted $C_{6-10}$aryl. In one embodiment of Formula I, Formula P-I, or Formula I-1, including any of the foregoing, $R^1$ is hydroxy and $R^2$ is unsubstituted phenyl. In one embodiment of Formula I, Formula P-I, or Formula I-1, including any of the foregoing, $R^1$ is hydroxy and $R^2$ is $C_{6-10}$aryl optionally substituted with one $C_{1-6}$alkyl group. In one embodiment of Formula I, Formula P-I, or Formula I-1, including any of the foregoing, $R^1$ is hydroxy and $R^2$ is $C_{6-10}$aryl optionally substituted with one methyl group. In one embodiment of Formula I, Formula P-I, or Formula I-1, including any of the foregoing, $R^1$ is hydroxy and $R^2$ is phenyl optionally substituted with one methyl group in the para position.

In one embodiment of Formula I, Formula P-I, or Formula I-1, including any of the foregoing, $R^1$ is $C_{1-6}$alkoxy and $R^2$ is —$CH_2C(O)OR^6$. In one embodiment of Formula I, Formula P-I, or Formula I-1, including any of the foregoing, $R^1$ is $C_{1-6}$alkoxy and $R^2$ is —$CH_2C(O)OH$. In one embodiment of Formula I, Formula P-I, or Formula I-1, including any of the foregoing, $R^1$ is $C_{1-6}$alkoxy and $R^2$ is —$CH_2C(O)OC_{1-6}$alkyl. In one embodiment of Formula I, Formula P-I, or Formula I-1, including any of the foregoing, $R^1$ is $C_{1-6}$alkoxy and $R^2$ is —$CH_2C(O)OCH_3$. In one embodiment of Formula I, Formula P-I, or Formula I-1, including any of the foregoing, $R^1$ is methoxy and $R^2$ is —$CH_2C(O)OR^6$. In one embodiment of Formula I, Formula P-I, or Formula I-1, including any of the foregoing, $R^1$ is methoxy and $R^2$ is —$CH_2C(O)OH$. In one embodiment of Formula I, Formula P-I, or Formula I-1, including any of the foregoing, $R^1$ is methoxy and $R^2$ is —$CH_2C(O)OC_{1-6}$alkyl. In one embodiment of Formula I, Formula P-I, or Formula I-1, including any of the foregoing, $R^1$ is methoxy and $R^2$ is —$CH_2C(O)OCH_3$. In one embodiment of Formula I, Formula P-I, or Formula I-1, including any of the foregoing, $R^1$ is ethoxy and $R^2$ is —$CH_2C(O)OR^6$. In one embodiment of Formula I, Formula P-I, or Formula I-1, including any of the foregoing, $R^1$ is ethoxy and $R^2$ is —$CH_2C(O)OH$. In one embodiment of Formula I, Formula P-I, or Formula I-1, including any of the foregoing, $R^1$ is ethoxy and $R^2$ is —$CH_2C(O)OC_{1-6}$alkyl. In one embodiment of Formula I, Formula P-I, or Formula I-1, including any of the foregoing, $R^1$ is ethoxy and $R^2$ is —$CH_2C(O)OCH_3$. In one embodiment of Formula I, or Formula I-1, including any of the foregoing, $R^1$ is $C_{6-10}$aryl and $R^2$ is —$C_{1-6}$alkyl-$C(O)OR^6$. In one embodiment of Formula I, or Formula I-1, including any of the foregoing, $R^1$ is $C_{6-10}$aryl and $R^2$ is —$CH_2CH_2$—$C(O)OR^6$.

In one embodiment of Formula I or Formula P-I, $R^1$ and $R^3$ together form a $C_{3-10}$heterocycle that contains at least the —$P(R^2)(O)O$— group to which $R^1$ and $R^3$ are attached. In one embodiment of Formula I or Formula P-I, $R^1$ and $R^3$ together form a $C_{3-10}$heterocycle that contains at least the —$P(R^2)(O)O$— group to which $R^1$ and $R^3$ are attached and wherein the $C_{3-10}$heterocycle is optionally substituted with at least one $R^7$ group and/or the $C_{3-10}$ heterocycle is fused to one or two aryl groups.

In one embodiment of Formula I or Formula P-I, $R^1$ and $R^3$ together form a $C_{3-10}$ heterocycle that contains at least the —$P(R^2)(O)O$— group to which $R^1$ and $R^3$ are attached and the $C_{3-10}$heterocycle is fused to one or two aryl groups. For example, in one embodiment, the compound of Formula I or Formula P-I is a compound of Formula IA:

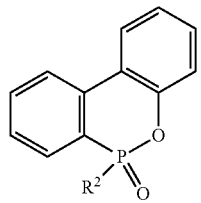

Formula IA or a salt thereof, an anion thereof, a hydrolytic product thereof, or a reduction product thereof.

In one embodiment of Formula IA, $R^2$ is hydrogen, hydroxy, or $C_{1-6}$alkoxy. In one embodiment of Formula IA, $R^2$ is hydrogen. In one embodiment of Formula IA, $R^2$ is $C_{6-10}$ aryl optionally substituted with at least one $R^7$. In one embodiment of Formula IA, $R^2$ is $C_{6-10}$ aryl optionally substituted with at least one hydroxy. In one embodiment of Formula IA, $R^2$ is $C_{6-10}$aryl optionally substituted with two hydroxy groups. In one embodiment of Formula IA, $R^2$ is phenyl optionally substituted with two hydroxy groups.

In one embodiment of Formula I or Formula P-I, $R^1$ and $R^3$ together form a $C_{3-10}$ heterocycle that contains at least the —$P(R^2)(O)O$— group to which $R^1$ and $R^3$ are attached and wherein the $C_{3-10}$heterocycle is optionally substituted with at least one $R^7$ group. For example, in one embodiment, the compound of Formula I or Formula P-I is a compound of Formula 1B:

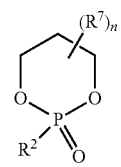

Formula IB or a salt thereof, an anion thereof, a hydrolytic product thereof, or a reduction product thereof; wherein n is an integer selected from 0, 1, and 2.

In one embodiment of Formula IB, $R^2$ is hydrogen, hydroxy, or alkoxy. In one embodiment of Formula IB, $R^2$ is hydrogen.

In one embodiment of Formula IB, including any of the foregoing, n is 0. In one embodiment of Formula IB, including any of the foregoing, n is 1. In one embodiment of Formula IB, including any of the foregoing, n is 2.

In one embodiment of Formula IB, including any of the foregoing, $R^7$ is independently selected from $C_{1-6}$alkyl and hydroxy$C_{1-6}$alkyl. In one embodiment of Formula IB, including any of the foregoing, n is 1 and $R^7$ is $C_{1-6}$alkyl. In one embodiment of Formula IB, including any of the foregoing, n is 2 and $R^7$ is $C_{1-6}$alkyl. In one embodiment of Formula IB, including any of the foregoing, n is 2 and $R^7$ is methyl.

In one embodiment of Formula I or Formula P-I, $R^1$, $R^2$, and $R^3$ together form a bridged $C_{3-10}$heterocycle that contains at least the —$P(O)O$— group to which $R^1$, $R^2$, and $R^3$ are attached optionally substituted with at least one $R^7$ group. For example, in one embodiment, the compound of Formula I or Formula P-I is a compound of Formula 1C:

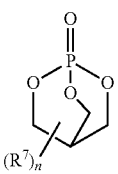

Formula IC or a salt thereof, an anion thereof, a hydrolytic product thereof, or a reduction product thereof; wherein n is an integer selected from 0, 1, and 2.

In one embodiment of Formula IC, including any of the foregoing, n is 0. In one embodiment of Formula IC, including any of the foregoing, n is 1. In one embodiment of Formula IC, including any of the foregoing, n is 2.

In one embodiment of Formula IC, including any of the foregoing, $R^7$ is independently selected from alkyl and hydroxyC$_{1-6}$alkyl. In one embodiment of Formula IC, including any of the foregoing, n is 1 and $R^7$ is hydroxyC$_{1-6}$alkyl. In one embodiment of Formula IC, including any of the foregoing, n is 1 and $R^7$ is —CH$_2$OH.

In one embodiment of Formula I or Formula P-I, $R^1$, $R^2$, and $R^3$ together form a spirocyclic C$_{3-10}$heterocycle that contains at least the —P($R^2$)(O)O— group to which $R^1$ and $R^3$ are attached and wherein the spirocyclic C$_{3-10}$heterocycle is optionally substituted with at least one $R^7$ group. For example, in one embodiment, the compound of Formula I or Formula P-I is a compound of Formula 1D:

Formula ID

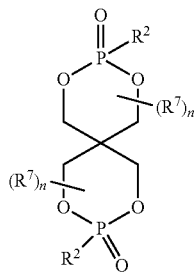

or a salt thereof, an anion thereof, a hydrolytic product thereof, or a reduction product thereof; wherein $R^2$, $R^7$, and n are as defined herein.

In one embodiment of Formula ID, including any of the foregoing, n is 0.

In one embodiment of Formula ID, including any of the foregoing, $R^2$ is C$_{6-10}$ aryloxy optionally substituted with at least one $R^7$. In one embodiment of Formula ID, including any of the foregoing, $R^2$ is C$_{6-10}$aryloxy optionally substituted with at least one C$_{1-6}$ alkyl group. In one embodiment of Formula ID, including any of the foregoing, $R^2$ is C$_{6-10}$ aryloxy optionally substituted with two C$_{1-6}$alkyl groups. In one embodiment of Formula ID, including any of the foregoing, $R^2$ is —O-phenyl optionally substituted with two C$_{1-6}$alkyl groups. In one embodiment of Formula ID, including any of the foregoing, $R^2$ is —O-phenyl optionally substituted with two tert-butyl groups.

In one embodiment of Formula II, Formula P-II, Formula II-1, or Formula II-2, including any of the foregoing, $R^4$ is hydrogen. In one embodiment of Formula II, Formula P-II, Formula II-1, or Formula II-2, including any of the foregoing, $R^4$ is C$_{1-6}$alkoxy. In one embodiment of Formula II, Formula P-II, Formula II-1, or Formula II-2, including any of the foregoing, $R^4$ is —CH$_2$C(O)O$R^6$. In one embodiment of Formula II, Formula P-II, Formula II-1, or Formula II-2, including any of the foregoing, $R^4$ is —CH$_2$C(O)OH. In one embodiment of Formula II, Formula P-II, Formula II-1, or Formula II-2, including any of the foregoing, $R^4$ is —CH$_2$C(O)OC$_{1-6}$alkyl. In one embodiment of Formula II, Formula P-II, Formula II-1, or Formula II-2, including any of the foregoing, $R^4$ is —CH$_2$C(O)OCH$_3$. In one embodiment of Formula II, Formula P-II, Formula II-1, or Formula II-2, including any of the foregoing, $R^4$ is hydroxyC$_{1-6}$alkyl.

In one embodiment of Formula II, Formula P-II, Formula II-1, or Formula II-2, including any of the foregoing, $R^4$ is unsubstituted C$_{6-10}$aryl. In one embodiment of Formula II, Formula P-II, Formula II-1, or Formula II-2, including any of the foregoing, $R^4$ is C$_{6-10}$aryl optionally substituted with one $R^7$. In one embodiment of Formula II, Formula P-II, Formula II-1, or Formula II-2, including any of the foregoing, $R^4$ is C$_{6-10}$aryl optionally substituted with one C$_{1-6}$alkyl. In one embodiment of Formula II, Formula P-II, Formula II-1, or Formula II-2, including any of the foregoing, $R^4$ is C$_{6-10}$aryl optionally substituted with one methyl group. In one embodiment of Formula II, Formula P-II, Formula II-1, or Formula II-2, including any of the foregoing, $R^4$ is unsubstituted phenyl. In one embodiment of Formula II, Formula P-II, Formula II-1, or Formula II-2, including any of the foregoing, $R^4$ is phenyl substituted with one methyl group. In one embodiment of Formula II, Formula P-II, Formula II-1, or Formula II-2, including any of the foregoing, $R^4$ is phenyl substituted with one methyl group in the para position.

In one embodiment of Formula II, Formula P-II, Formula II-1, or Formula II-2, including any of the foregoing, $R^4$ is C$_{6-10}$arylC$_{1-6}$alkyl wherein the aryl group is optionally substituted with at least one $R^7$. In one embodiment of Formula II, Formula P-II, Formula II-1, or Formula II-2, including any of the foregoing, $R^4$ is C$_{6-10}$aryloxy wherein the aryl group is optionally substituted with at least one $R^7$. In one embodiment of Formula II, Formula P-II, Formula II-1, or Formula II-2, including any of the foregoing, $R^4$ is C$_{6-10}$arylC$_{1-6}$alkoxy wherein the aryl group is optionally substituted with at least one $R^7$.

In one embodiment of Formula II, Formula P-II, or Formula II-1, including any of the foregoing, $R^5$ is hydrogen. In one embodiment of Formula II, Formula P-II, or Formula II-1, including any of the foregoing, $R^5$ is C$_{1-6}$alkoxy. In one embodiment of Formula II, Formula P-II, or Formula II-1, including any of the foregoing, $R^5$ is —CH$_2$C(O)O$R^6$. In one embodiment of Formula II, Formula P-II, or Formula II-1, including any of the foregoing, $R^5$ is —CH$_2$C(O)OH. In one embodiment of Formula II, Formula P-II, or Formula II-1, including any of the foregoing, $R^5$ is —CH$_2$C(O)OC$_{1-6}$alkyl. In one embodiment of Formula II, Formula P-II, or Formula II-1, including any of the foregoing, $R^5$ is —CH$_2$C(O)OCH$_3$. In one embodiment of Formula II, Formula P-II, or Formula II-1, including any of the foregoing, $R^5$ is hydroxyC$_{1-6}$alkyl.

In one embodiment of Formula II, Formula P-II, or Formula II-1, including any of the foregoing, $R^5$ is unsubstituted C$_{6-10}$aryl. In one embodiment of Formula II, Formula P-II, or Formula II-1, including any of the foregoing, $R^5$ is C$_{6-10}$aryl optionally substituted with one $R^7$. In one embodiment of Formula II, Formula P-II, or Formula II-1, including any of the foregoing, $R^5$ is C$_{6-10}$aryl optionally substituted with one C$_{1-6}$alkyl. In one embodiment of Formula II, Formula P-II, or Formula II-1, including any of the foregoing, $R^5$ is C$_{6-10}$aryl optionally substituted with one methyl group. In one embodiment of Formula II, Formula P-II, or Formula II-1, including any of the foregoing, $R^5$ is unsubstituted phenyl. In one embodiment of Formula II, Formula P-II, or Formula II-1, including any of the foregoing, $R^5$ is phenyl substituted with one methyl group. In one embodiment of Formula II, Formula P-II, or Formula II-1, including any of the foregoing, $R^5$ is phenyl substituted with one methyl group in the para position.

In one embodiment of Formula II, Formula P-II, or Formula II-1, including any of the foregoing, $R^5$ is C$_{6-10}$arylC$_{1-6}$alkyl wherein the aryl group is optionally substituted with at least one $R^7$. In one embodiment of Formula II, Formula P-II, or Formula II-1, including any of the foregoing, $R^5$ is C$_{6-10}$aryloxy wherein the aryl group is optionally substituted with at least one $R^7$. In one embodiment of Formula II, Formula P-II, or Formula II-1, including any of the foregoing, $R^5$ is $C_{6-10}$aryl$C_{1-6}$alkoxy wherein the aryl group is optionally substituted with at least one $R^7$.

In one embodiment of Formula II, Formula P-II, or Formula II-1, including any of the foregoing, $R^4$ and $R^5$ are both $C_{1-6}$alkoxy. In one embodiment of Formula II, Formula P-II, or Formula II-1, including any of the foregoing, $R^4$ and $R^5$ are both methoxy. In one embodiment of Formula II, Formula P-II, or Formula II-1, including any of the foregoing, $R^4$ and $R^5$ are both ethoxy. In one embodiment of Formula II, Formula P-II, or Formula II-1, including any of the foregoing, $R^4$ and $R^5$ are both unsubstituted $C_{6-10}$aryl. In one embodiment of Formula II, Formula P-II, or Formula II-1, including any of the foregoing, $R^4$ and $R^5$ are both $C_{6-10}$aryl optionally substituted with one $R^7$ group.

In one embodiment of Formula II, Formula P-II, or Formula II-1, including any of the foregoing, $R^4$ is hydrogen and $R^5$ is $C_{6-10}$aryl optionally substituted with one $R^7$ group. In one embodiment of Formula II, Formula P-II, or Formula II-1, including any of the foregoing, $R^4$ is hydrogen and $R^5$ is unsubstituted $C_{6-10}$aryl. In one embodiment of Formula II, Formula P-II, or Formula II-1, including any of the foregoing, $R^4$ is hydrogen and $R^5$ is unsubstituted phenyl. In one embodiment of Formula II, Formula P-II, or Formula II-1, including any of the foregoing, $R^4$ is hydrogen and $R^5$ is $C_{6-10}$aryl optionally substituted with one $C_{1-6}$alkyl group. In one embodiment of Formula II, Formula P-II, or Formula II-1, including any of the foregoing, $R^4$ is hydrogen and $R^5$ is $C_{6-10}$aryl optionally substituted with one methyl group. In one embodiment of Formula II, Formula P-II, or Formula II-1, including any of the foregoing, $R^4$ is hydrogen and $R^5$ is phenyl optionally substituted with one methyl group in the para position.

In one embodiment of Formula II, Formula P-II, or Formula II-1, including any of the foregoing, $R^4$ is hydroxy and $R^5$ is $C_{6-10}$aryl optionally substituted with one $R^7$ group. In one embodiment of Formula II, Formula P-II, or Formula II-1, including any of the foregoing, $R^4$ is hydroxy and $R^5$ is unsubstituted $C_{6-10}$aryl. In one embodiment of Formula II, Formula P-II, or Formula II-1, including any of the foregoing, $R^4$ is hydroxy and $R^5$ is unsubstituted phenyl. In one embodiment of Formula II, Formula P-II, or Formula II-1, including any of the foregoing, $R^4$ is hydroxy and $R^5$ is $C_{6-10}$aryl optionally substituted with one $C_{1-6}$alkyl group. In one embodiment of Formula II, Formula P-II, or Formula II-1, including any of the foregoing, $R^4$ is hydroxy and $R^5$ is $C_{6-10}$aryl optionally substituted with one methyl group. In one embodiment of Formula II, Formula P-II, or Formula II-1, including any of the foregoing, $R^4$ is hydroxy and $R^5$ is phenyl optionally substituted with one methyl group in the para position.

In one embodiment of Formula II, Formula P-II, or Formula II-1, including any of the foregoing, $R^4$ is $C_{1-6}$alkoxy and $R^5$ is —$CH_2C(O)OR^6$. In one embodiment of Formula II, Formula P-II, or Formula II-1, including any of the foregoing, $R^4$ is $C_{1-6}$alkoxy and $R^5$ is —$CH_2C(O)OH$. In one embodiment of Formula II, Formula P-II, or Formula II-1, including any of the foregoing, $R^4$ is $C_{1-6}$alkoxy and $R^5$ is —$CH_2C(O)OC_{1-6}$alkyl. In one embodiment of Formula II, Formula P-II, or Formula II-1, including any of the foregoing, $R^4$ is $C_{1-6}$alkoxy and $R^5$ is —$CH_2C(O)OCH_3$. In one embodiment of Formula II, Formula P-II, or Formula II-1, including any of the foregoing, $R^4$ is methoxy and $R^5$ is —$CH_2C(O)OR^6$. In one embodiment of Formula II, Formula P-II, or Formula II-1, including any of the foregoing, $R^4$ is methoxy and $R^5$ is —$CH_2C(O)OH$. In one embodiment of Formula II, Formula P-II, or Formula II-1, including any of the foregoing, $R^4$ is methoxy and $R^5$ is —$CH_2C(O)OC_{1-6}$alkyl. In one embodiment of Formula II, Formula P-II, or Formula II-1, including any of the foregoing, $R^4$ is methoxy and $R^5$ is —$CH_2C(O)OCH_3$. In one embodiment of Formula II, Formula P-II, or Formula II-1, including any of the foregoing, $R^4$ is ethoxy and $R^5$ is —$CH_2C(O)OR^6$. In one embodiment of Formula II, Formula P-II, or Formula II-1, including any of the foregoing, $R^4$ is ethoxy and $R^5$ is —$CH_2C(O)OH$. In one embodiment of Formula II, Formula P-II, or Formula II-1, including any of the foregoing, $R^4$ is ethoxy and $R^5$ is —$CH_2C(O)OC_{1-6}$alkyl. In one embodiment of Formula II, Formula P-II, or Formula II-1, including any of the foregoing, $R^4$ is ethoxy and $R^5$ is —$CH_2C(O)OCH_3$.

In one embodiment of Formula II or Formula P-II, $R^3$, $R^4$, and $R^5$ together form a bridged $C_{3-10}$heterocycle that contains at least the —P—O— group to which $R^3$, $R^4$, and $R^5$ are attached wherein the $C_{3-10}$heterocycle is optionally substituted with at least one $R^7$ group. For example, in one embodiment, the compound of Formula II or Formula P-II is a compound of Formula IIA:

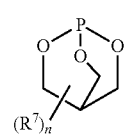

Formula IIA or a salt thereof, an anion thereof, a hydrolytic product thereof, or a reduction product thereof.

In one embodiment of Formula IIA, including any of the foregoing, n is 0. In one embodiment of Formula IIA, including any of the foregoing, n is 1. In one embodiment of Formula IIA, including any of the foregoing, n is 2.

In one embodiment of Formula IIA, including any of the foregoing, $R^7$ is independently selected from $C_{1-6}$alkyl. In one embodiment of Formula IIA, including any of the foregoing, n is 1 and $R^7$ is $C_{1-6}$alkyl. In one embodiment of Formula IIA, including any of the foregoing, n is 1 and $R^7$ is ethyl.

In one embodiment of Formula II or Formula P-II, $R^3$, $R^4$, and $R^5$ together form a spirocyclic $C_{3-10}$heterocycle that contains at least the —P($R^5$)O— group to which $R^3$ and $R^4$ are attached and wherein the spirocyclic $C_{3-10}$heterocycle is optionally substituted with at least one $R^7$ group. For example, in one embodiment, the compound of Formula II or Formula II-P is a compound of Formula IIB:

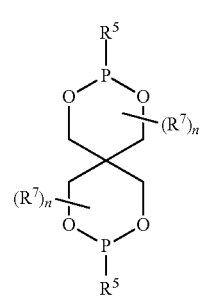

Formula IIB or a salt thereof, an anion thereof, a hydrolytic product thereof, or a reduction product thereof.

In one embodiment of Formula IIB, n is 0.

In one embodiment of Formula IIB, including any of the foregoing, $R^5$ is independently selected from $C_{1-20}$alkoxy. In one embodiment of Formula IIB, including any of the foregoing, $R^5$ is independently selected from $C_{10-20}$alkoxy. In one embodiment of Formula IIB, including any of the foregoing, $R^5$ is independently selected from $C_{15-20}$alkoxy. In one embodiment of Formula IIB, including any of the foregoing, $R^5$ is $C_{18}$alkoxy.

In one embodiment of Formula I, Formula P-I, Formula I-1, Formula I-2, Formula II, Formula P-II, Formula II-1, Formula II-2, Formula IA, Formula IB, or Formula IC, $R^7$ is $C_{1-6}$alkyl. In one embodiment of Formula I, Formula P-I, Formula I-1, Formula I-2, Formula II, Formula P-II, Formula II-1, Formula II-2, Formula IA, Formula IB, or Formula IC, $R^7$ is methyl. In one embodiment of Formula I, Formula P-I, Formula I-1, Formula I-2, Formula II, Formula P-II, Formula II-1, Formula II-2, Formula IA, Formula IB, or Formula IC, $R^7$ is hydroxy$C_{1-6}$alkyl. In one embodiment of Formula I, Formula P-I, Formula I-1, Formula I-2, Formula II, Formula P-II, Formula II-1, Formula II-2, Formula IA, Formula IB, or Formula IC, $R^7$ is —$CH_2$—OH. In one embodiment of Formula I, Formula I-1, Formula I-2, Formula II, Formula II-1, Formula II-2, Formula IA, Formula IB, or Formula IC, $R^7$ is —OH.

In one embodiment of Formula I, Formula P-I, Formula I-1, Formula I-2, Formula II, Formula P-II, Formula II-1, Formula II-2, Formula IA, Formula IB, or Formula IC, $R^6$ is $C_{1-6}$alkyl. In one embodiment of Formula I, Formula P-I, Formula I-1, Formula I-2, Formula II, Formula P-II, Formula II-1, Formula II-2, Formula IA, Formula IB, or Formula IC, $R^6$ is methyl. In one embodiment of Formula I, Formula P-I, Formula I-1, Formula I-2, Formula II, Formula P-II, Formula II-1, Formula II-2, Formula IA, Formula IB, or Formula IC, $R^6$ is hydrogen.

In one embodiment of Formula I, Formula P-I, or Formula I-1, including any of the foregoing, $R^1$ and $R^2$ are not both —OH.

In one embodiment of Formula I, Formula P-I, or Formula I-1, including any of the foregoing, the electrolyte additive is not phenylphosphoric acid.

In one embodiment of Formula P-I or Formula P-II, including any of the foregoing:
$R^1$ and $R^2$ are independently selected from hydrogen, —OH, $C_{1-6}$alkoxy, —$CH_2C(O)OR^6$, and $C_{6-10}$aryl, wherein the $C_{6-10}$aryl is optionally substituted with at least one $R^7$;
$R^3$ is hydrogen or $C_{1-6}$alkyl; or
$R^1$ and $R^3$ together form a $C_{3-10}$heterocycle that contains at least one oxygen atom; wherein the $C_{3-10}$heterocycle is optionally substituted with at least one $R^7$ group; and/or
the $C_{3-10}$heterocycle is optionally fused to one or two $C_{6-10}$aryl groups; or
$R^1$, $R^2$, and $R^3$ together form a bridged $C_{3-10}$heterocycle that contains at least one oxygen atom and wherein the $C_{3-10}$heterocycle is optionally substituted with at least one $R^7$ group;
$R^4$ and $R^5$ are $C_{1-6}$alkoxy;
$R^6$ is hydrogen or $C_{1-6}$alkyl; and
$R^7$ is independently selected from $C_{1-6}$alkyl and hydroxy$C_{1-6}$alkyl.

In one embodiment of Formula P-I, Formula I, Formula I-1, or Formula 1-2, including any of the foregoing,
$R^1$ is $C_{6-10}$aryl optionally substituted with at least one $R^7$;
$R^2$ is selected from hydrogen, —OH, $C_{1-20}$alkoxy, —$C_{1-6}$alkyl-C(O)OR^6$, hydroxy$C_{1-6}$alkyl, $C_{6-10}$aryl, $C_{6-10}$aryl$C_{1-6}$alkyl, $C_{6-10}$ aryloxy, and $C_{6-10}$aryl$C_{1-6}$alkoxy wherein the $C_{6-10}$aryl, either alone or as part of another group, is optionally substituted with at least one $R^7$; and
$R^3$ is hydrogen, $C_{1-6}$alkyl, hydroxy$C_{1-6}$alkyl, $C_{6-10}$aryl, or $C_{6-10}$aryl$C_{1-6}$alkyl, wherein the $C_{6-10}$aryl or the $C_{6-10}$aryl$C_{1-6}$alkyl is optionally substituted with at least one $R^7$.

In one embodiment of Formula P-I, Formula I, Formula I-1, or Formula 1-2, including any of the foregoing,
$R^1$ is $C_{6-10}$aryl optionally substituted with at least one $R^7$;
$R^2$ is selected from hydrogen, —OH, —$C_{1-6}$alkyl-C(O)OR^6$, $C_{6-10}$aryl, $C_{6-10}$ aryloxy, and $C_{6-10}$aryl$C_{1-6}$alkoxy wherein the $C_{6-10}$aryl, either alone or as part of another group, is optionally substituted with at least one $R^7$; and
$R^3$ is hydrogen, $C_{1-6}$alkyl, $C_{6-10}$aryl, or $C_{6-10}$aryl$C_{1-6}$alkyl, wherein the $C_{6-10}$aryl or the $C_{6-10}$aryl$C_{1-6}$alkyl is optionally substituted with at least one $R^7$.

In one embodiment of Formula P-I, Formula I, Formula I-1, or Formula 1-2, including any of the foregoing,
$R^1$ is $C_{6-10}$aryl optionally substituted with at least one $R^7$;
$R^2$ is selected from hydrogen, —OH, —$C_{1-6}$alkyl-C(O)OR^6$, $C_{6-10}$aryl, $C_{6-10}$ aryloxy, and $C_{6-10}$aryl$C_{1-6}$alkoxy wherein the $C_{6-10}$aryl, either alone or as part of another group, is optionally substituted with at least one $R^7$; and
$R^3$ is hydrogen or $C_{1-6}$alkyl.

In one embodiment of Formula P-I, Formula I, Formula I-1, or Formula 1-2, including any of the foregoing,
$R^1$ is $C_{6-10}$aryl optionally substituted with at least one $R^7$;
$R^2$ is selected from hydrogen, —OH, —$C_{1-6}$alkyl-C(O)OR^6$, $C_{6-10}$aryl, $C_{6-10}$ aryloxy, and $C_{6-10}$aryl$C_{1-6}$alkoxy wherein the $C_{6-10}$aryl, either alone or as part of another group, is optionally substituted with at least one $R^7$; and
$R^3$ is hydrogen.

In one embodiment of Formula P-I, Formula I, Formula I-1, or Formula 1-2, including any of the foregoing,
$R^1$ is $C_{6-10}$aryl optionally substituted with at least one $R^7$;
$R^2$ is selected from hydrogen and —OH; and
$R^3$ is hydrogen.

In one embodiment of Formula P-I, Formula I, Formula I-1, or Formula 1-2, including any of the foregoing, the compound is of the formula:

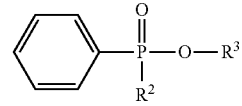

$R^2$ is selected from hydrogen, —OH, $C_{1-20}$alkoxy, —$C_{1-6}$alkyl-C(O)OR^6$, hydroxy$C_{1-6}$alkyl, $C_{6-10}$aryl, $C_{6-10}$aryl$C_{1-6}$alkyl, $C_{6-10}$aryloxy, and $C_{6-10}$aryl$C_{1-6}$alkoxy wherein the $C_{6-10}$aryl, either alone or as part of another group, is optionally substituted with at least one $R^7$; and
$R^3$ is hydrogen, $C_{1-6}$alkyl, hydroxy$C_{1-6}$alkyl, $C_{6-10}$aryl, or $C_{6-10}$aryl$C_{1-6}$alkyl, wherein the $C_{6-10}$aryl or the $C_{6-10}$aryl$C_{1-6}$alkyl is optionally substituted with at least one $R^7$.

In one embodiment of Formula P-I, Formula I, Formula I-1, or Formula 1-2, including any of the foregoing, the compound is of the formula:

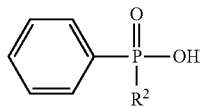

$R^2$ is selected from hydrogen, —OH, and $C_{1-20}$alkoxy, —$C_{1-6}$alkyl-C(O)OR$^6$, hydroxy$C_{1-6}$alkyl, $C_{6-10}$aryl, $C_{6-10}$aryl$C_{1-6}$alkyl, $C_{6-10}$aryloxy, and $C_{6-10}$aryl$C_{1-6}$alkoxy wherein the $C_{6-10}$aryl, either alone or as part of another group, is optionally substituted with at least one $R^7$.

In one embodiment of Formula P-I, Formula I, Formula I-1, or Formula 1-2, including any of the foregoing, the compound is of the formula:

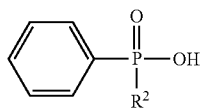

$R^2$ is selected from hydrogen, —OH, and —$C_{1-6}$alkyl-C(O)OR$^6$.

In one embodiment of Formula P-I, Formula I, Formula I-1, or Formula 1-2, including any of the foregoing, the compound is of the formula:

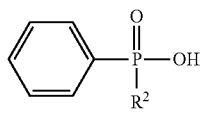

$R^2$ is selected from hydrogen and —OH.

In one embodiment of Formula P-I, Formula I, Formula I-1, or Formula 1-2, including any of the foregoing, the compound is of the formula:

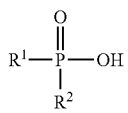

$R^1$ is selected from hydrogen, —OH, —$C_{1-6}$alkyl-C(O)OR$^6$, $C_{6-10}$aryl, and $C_{6-10}$ aryloxy wherein the $C_{6-10}$aryl, either alone or as part of another group, is optionally substituted with at least one $R^7$; and $R^2$ is selected from —$C_{1-6}$alkyl-C(O)OR$^6$, $C_{6-10}$aryl, and $C_{6-10}$aryloxy wherein the $C_{6-10}$aryl, either alone or as part of another group, is optionally substituted with at least one $R^7$.

In one embodiment of Formula P-I, Formula I, Formula I-1, or Formula 1-2, including any of the foregoing, the compound is of the formula:

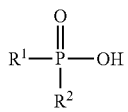

$R^1$ is selected from hydrogen and —OH; and
$R^2$ is $C_{6-10}$aryl optionally substituted with at least one $R^7$.

In one embodiment of Formula P-I, Formula I, Formula I-1, or Formula 1-2, including any of the foregoing, $R^3$ is hydrogen, hydroxy$C_{1-6}$alkyl, $C_{6-10}$aryl, or $C_{6-10}$aryl$C_{1-6}$alkyl, wherein the $C_{6-10}$aryl or the $C_{6-10}$aryl$C_{1-6}$alkyl is optionally substituted with at least one $R^7$.

In one embodiment of Formula P-I, Formula I-1, or Formula 1-2, including any of the foregoing,
$R^1$ is hydrogen, —OH, $C_{1-6}$alkoxy, —$C_{1-6}$alkyl-C(O)OR$^6$, hydroxy$C_{1-6}$alkyl, $C_{6-10}$ aryl, $C_{6-10}$aryl$C_{1-6}$alkyl, $C_{6-10}$aryloxy, and $C_{6-10}$aryl$C_{1-6}$alkoxy wherein the $C_{6-10}$aryl, either alone or as part of another group, is optionally substituted with at least one $R^7$; and
$R^2$ is hydrogen, —OH, —$C_{1-6}$alkyl-C(O)OR$^6$, hydroxy$C_{1-6}$alkyl, $C_{6-10}$aryl, $C_{6-10}$aryl$C_{1-6}$alkyl, $C_{6-10}$aryloxy, and $C_{6-10}$aryl$C_{1-6}$alkoxy wherein the $C_{6-10}$aryl, either alone or as part of another group, is optionally substituted with at least one $R^7$.

In one embodiment of Formula I, Formula I-1, or Formula 1-2, including any of the foregoing,
$R^1$ is hydrogen, —OH, $C_{1-20}$alkoxy, —$C_{1-6}$alkyl-C(O)OR$^6$, hydroxy$C_{1-6}$alkyl, $C_{6-10}$ aryl, $C_{6-10}$aryl$C_{1-6}$alkyl, $C_{6-10}$aryloxy, and $C_{6-10}$aryl$C_{1-6}$alkoxy wherein the $C_{6-10}$aryl, either alone or as part of another group, is optionally substituted with at least one $R^7$; and
$R^2$ is hydrogen, —OH, $C_{5-20}$alkoxy, —$C_{1-6}$alkyl-C(O)OR$^6$, hydroxy$C_{1-6}$alkyl, $C_{6-10}$ aryl, $C_{6-10}$aryl$C_{1-6}$alkyl, $C_{6-10}$aryloxy, and $C_{6-10}$aryl$C_{1-6}$alkoxy wherein the $C_{6-10}$aryl, either alone or as part of another group, is optionally substituted with at least one $R^7$.

In one embodiment of Formula I or Formula P-I, Formula I-1, or Formula 1-2, including any of the foregoing,
$R^1$ and $R^2$ are independently selected from hydrogen, —OH, $C_{6-10}$aryloxy, $C_{6-10}$ aryl, $C_{6-10}$aryl$C_{1-6}$alkoxy, and —$C_{1-6}$alkyl-C(O)OR$^6$ wherein the $C_{6-10}$aryl, either alone or as part of another group, is optionally substituted with at least one $R^7$;
$R^3$ is selected from hydrogen, $C_{6-10}$aryl, $C_{1-6}$alkyl, $C_{6-10}$aryl$C_{1-6}$alkyl wherein the $C_{6-10}$aryl or the $C_{6-10}$aryl$C_{1-6}$alkyl is optionally substituted with at least one $R^7$; and
$R^7$ is independently selected from $C_{1-6}$alkyl and hydroxy$C_{1-6}$alkyl, and wherein $R^7$ is not further substituted.

In one embodiment of Formula I or Formula P-I, Formula I-1, or Formula 1-2, including any of the foregoing,
$R^1$ and $R^2$ are independently selected from hydrogen, —OH, and $C_{6-10}$aryl;
$R^3$ is hydrogen; or
$R^1$ and $R^3$ together form a $C_{3-10}$heterocycle that contains at least the
—P($R^2$)(O)O— group to which $R^1$ and $R^3$ are attached; wherein the $C_{3-10}$ heterocycle is optionally substituted with at least one $R^7$ group; and/or the $C_{3-10}$heterocycle is optionally fused to one or two $C_{6-10}$aryl groups; or
$R^1$, $R^2$, and $R^3$ together form a bridged $C_{3-10}$heterocycle that contains at least the —P(O)O— group to which $R^1$, $R^2$, and $R^3$ are attached wherein the $C_{3-10}$heterocycle is optionally substituted with at least one $R^7$ group; and
$R^7$ is independently selected from $C_{1-6}$alkyl and hydroxy$C_{1-6}$alkyl, and wherein $R^7$ is not further substituted.

In one embodiment of Formula I or Formula P-I, Formula I-1, or Formula 1-2, including any of the foregoing,
$R^1$ and $R^2$ are independently selected from hydrogen, —OH, and $C_{6-10}$aryl;

R³ is hydrogen; or

R¹ and R³ together form a $C_{3-10}$heterocycle that contains at least the

—P(R²)(O)O— group to which R¹ and R³ are attached; wherein the $C_{3-10}$ heterocycle is optionally substituted with at least one R⁷ group; and R⁷ is independently selected from $C_{1-6}$alkyl and hydroxy$C_{1-6}$alkyl, and wherein R⁷ is not further substituted.

In one embodiment of Formula I or Formula P-I, Formula I-1, or Formula 1-2, including any of the foregoing, R¹ and R² are independently selected from hydrogen, —OH, $C_{6-10}$aryloxy, $C_{6-10}$ aryl, $C_{6-10}$aryl$C_{1-6}$alkoxy, and —$C_{1-6}$alkyl-C(O)OR⁶ wherein the $C_{6-10}$aryl, either alone or as part of another group, is optionally substituted with at least one R⁷;

R³ is selected from hydrogen, $C_{6-10}$aryl, $C_{1-6}$alkyl, $C_{6-10}$aryl$C_{1-6}$alkyl wherein the $C_{6-10}$aryl or the $C_{6-10}$aryl$C_{1-6}$alkyl is optionally substituted with at least one R⁷; or R¹ and R³ together form a $C_{3-10}$heterocycle that contains at least the —P(R²)(O)O— group to which R¹ and R³ are attached; wherein the $C_{3-10}$ heterocycle is optionally substituted with at least one R⁷ group; and/or the $C_{3-10}$heterocycle is optionally fused to one or two $C_{6-10}$aryl groups; or R¹, R², and R³ together form a bridged $C_{3-10}$heterocycle that contains at least the —P(O)O— group to which R¹, R², and R³ are attached wherein the $C_{3-10}$heterocycle is optionally substituted with at least one R⁷ group; and R⁷ is independently selected from $C_{1-6}$alkyl and hydroxy$C_{1-6}$alkyl, and wherein R⁷ is not further substituted.

In one embodiment, the aqueous electrolyte comprises an electrolyte additive selected from:

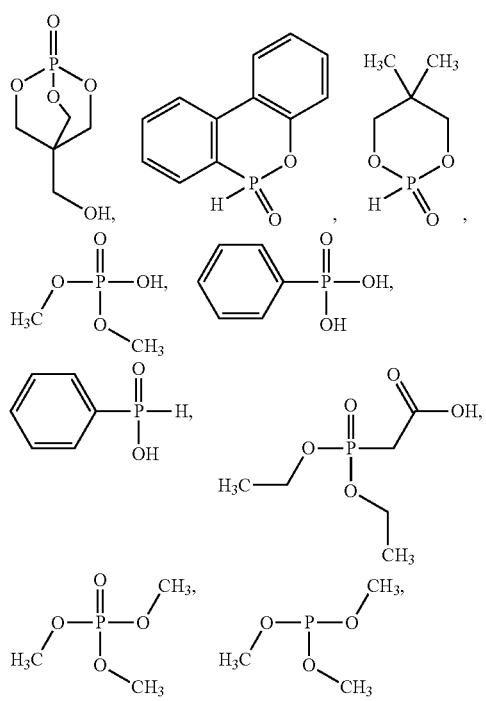

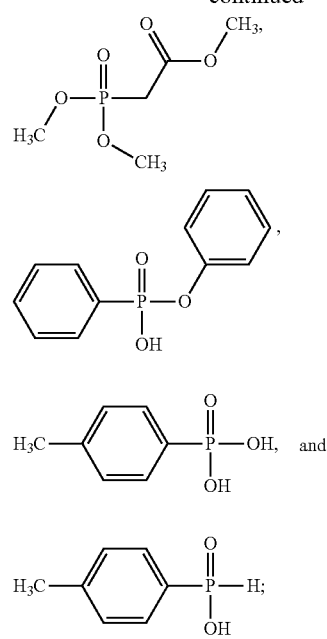

or a salt thereof, an anion thereof, hydrolytic product thereof, or an electrochemical reduction product thereof, or a combination thereof.

In one embodiment, the aqueous electrolyte comprises an electrolyte additive selected from:

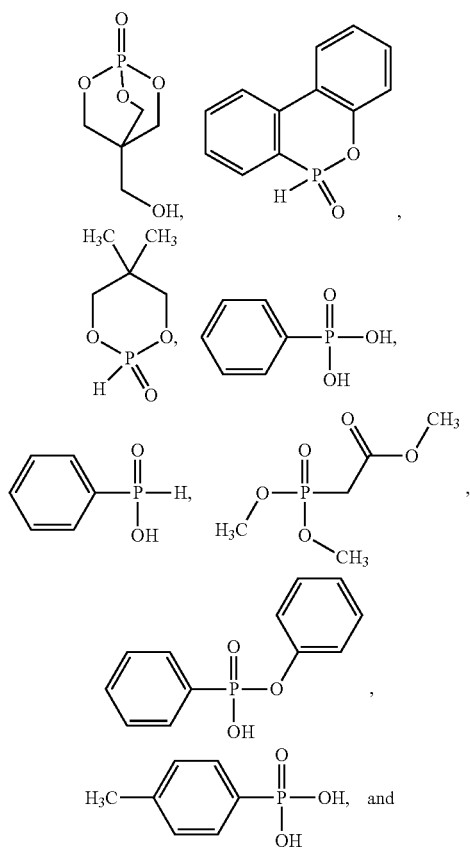

-continued

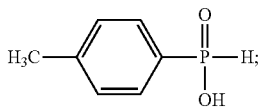

or a salt thereof, an anion thereof, hydrolytic product thereof, or an electrochemical reduction product thereof, or a combination thereof.

In one embodiment, the aqueous electrolyte comprises an electrolyte additive selected from:

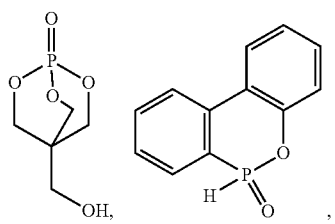

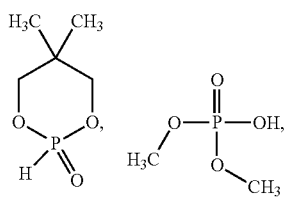

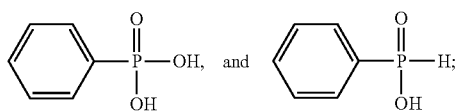

or a salt thereof, an anion thereof, hydrolytic product thereof, or an electrochemical reduction product thereof, or a combination thereof.

In one embodiment, the aqueous electrolyte comprises an electrolyte additive selected from:

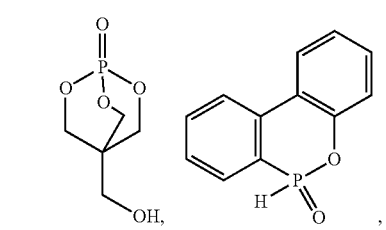

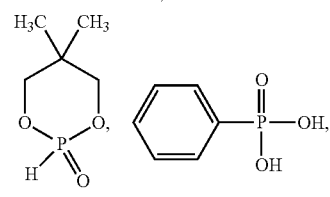

or a salt thereof, an anion thereof, hydrolytic product thereof, or an electrochemical reduction product thereof, or a combination thereof.

In one embodiment, the aqueous electrolyte comprises an electrolyte additive selected from:

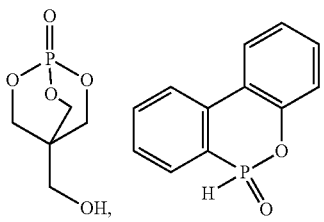

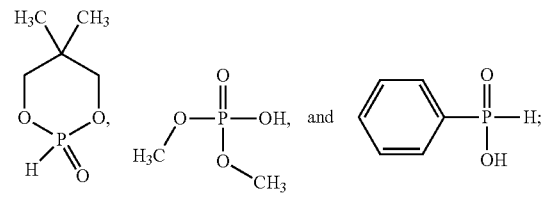

or a salt thereof, an anion thereof, hydrolytic product thereof, or an electrochemical reduction product thereof, or a combination thereof.

In one embodiment, the aqueous electrolyte comprises an electrolyte additive selected from:

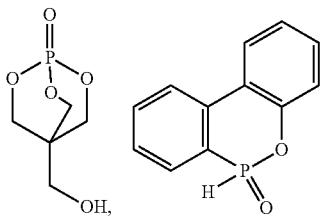

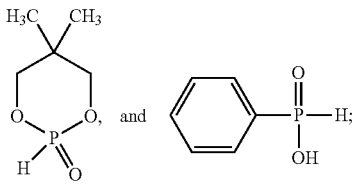

or a salt thereof, an anion thereof, hydrolytic product thereof, or an electrochemical reduction product thereof, or a combination thereof.

In one embodiment, the aqueous electrolyte comprises an electrolyte additive selected from:

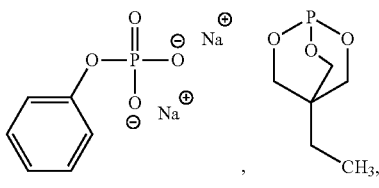

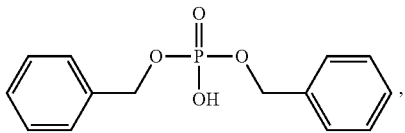

-continued

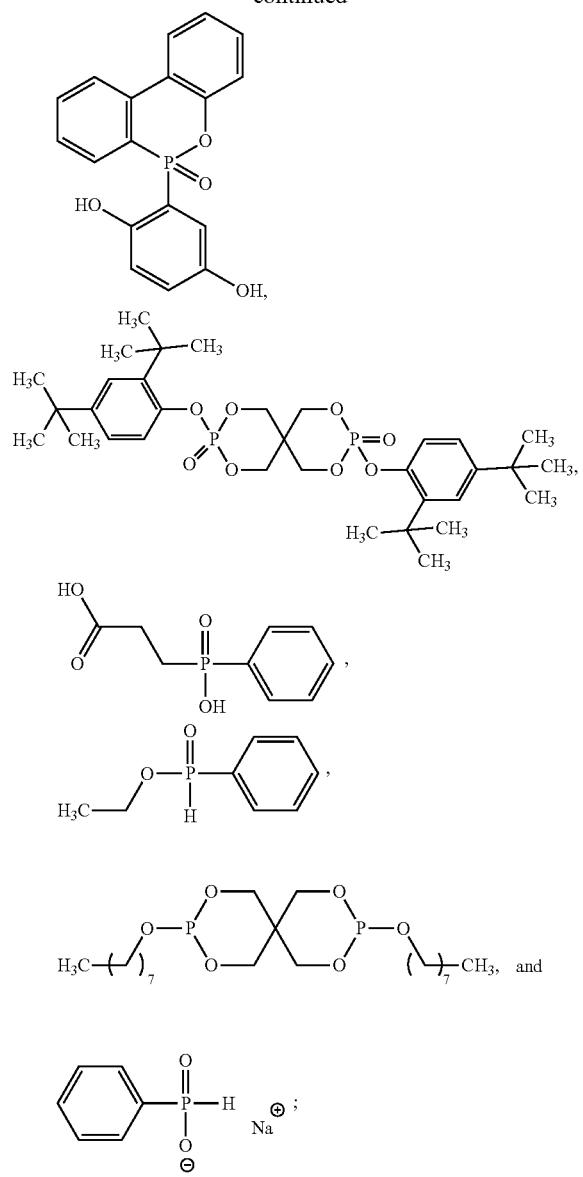

or a salt thereof, an anion thereof, hydrolytic product thereof, or an electrochemical reduction product thereof, or a combination thereof.

In one embodiment, including any of the foregoing, the aqueous electrolyte comprises an electrolyte additive of the formula:

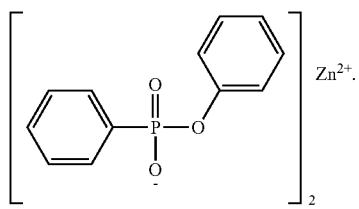

In one embodiment, the aqueous electrolyte comprises at least two electrolyte additives selected from:

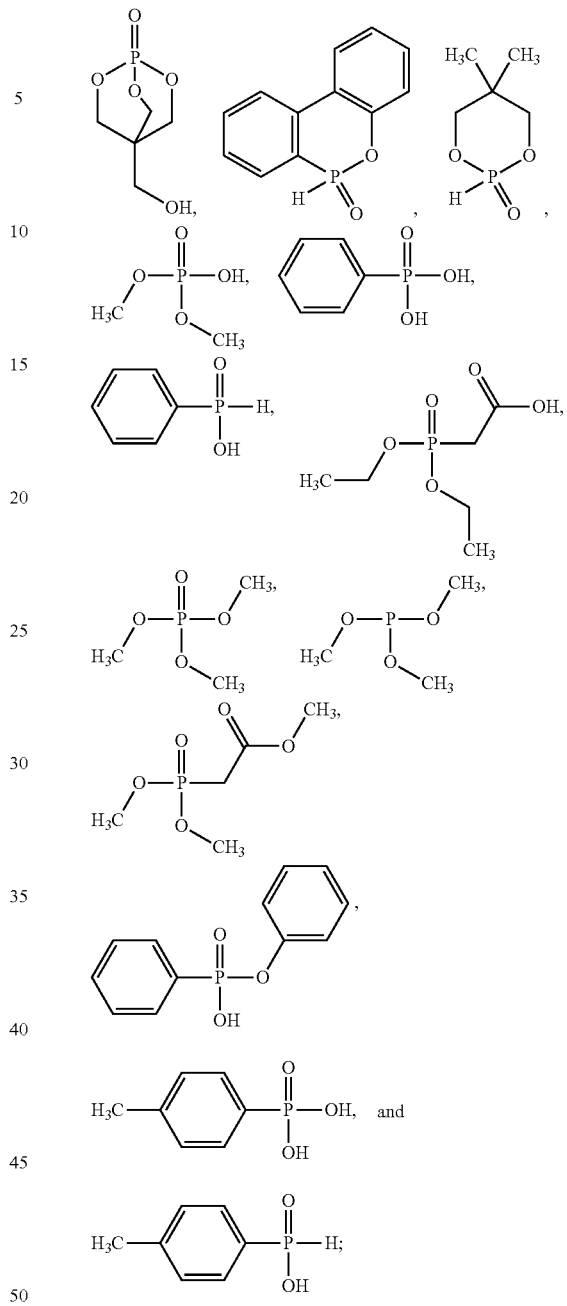

or a salt thereof, an anion thereof, hydrolytic product thereof, or an electrochemical reduction product thereof.

In one embodiment, the aqueous electrolyte comprises an electrolyte additive

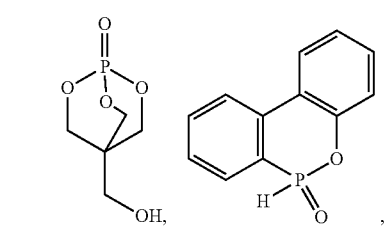

-continued

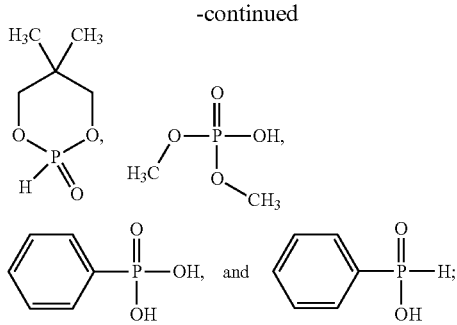

or a salt thereof, an anion thereof, hydrolytic product thereof, or an electrochemical reduction product thereof; and a second electrolyte additive selected from

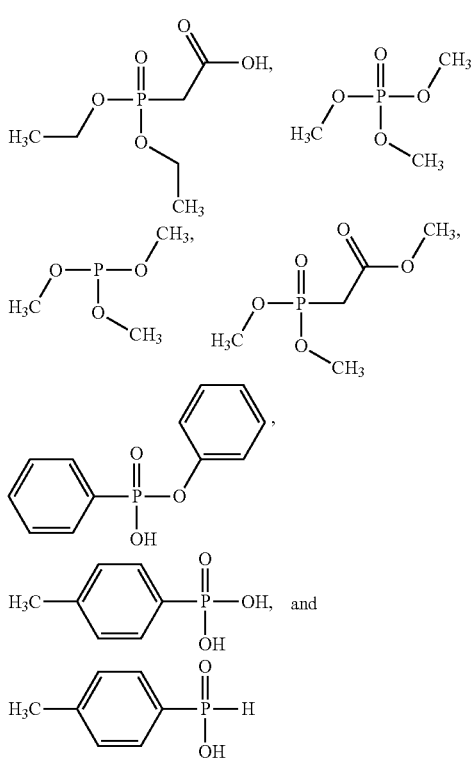

or a salt thereof, an anion thereof, hydrolytic product thereof, or an electrochemical reduction product thereof.

In one embodiment, the aqueous electrolyte comprises

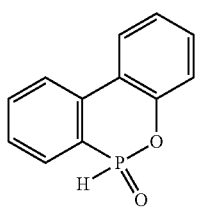

or a salt thereof, an anion thereof, hydrolytic product thereof, or an electrochemical reduction product thereof; and a second electrolyte additive selected from or a salt thereof, an anion thereof, hydrolytic product thereof, or an electrochemical reduction product thereof.

In one embodiment, the aqueous electrolyte

or a salt thereof, an anion thereof, hydrolytic product thereof, or an electrochemical reduction product thereof; and a second electrolyte additive selected from

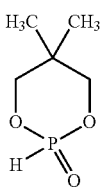

and

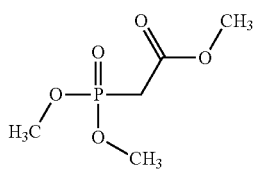

or a salt thereof, an anion thereof, hydrolytic product thereof, or an electrochemical reduction product thereof.

In one embodiment, the aqueous electrolyte comprises at least one electrolyte additive selected from:

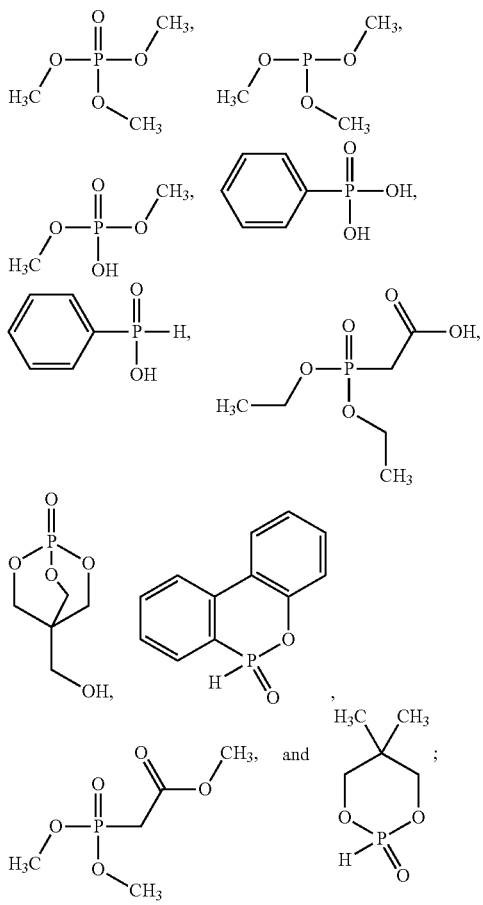

or a salt thereof, an anion thereof, hydrolytic product thereof, or an electrochemical reduction product thereof.

In some examples, including any of the foregoing, the phosphorus electrolyte additive or combination of phosphorus electrolyte additives is present in the electrolyte at a concentration equal to, or greater than, about 0.001 weight percent (wt %) to less than, or equal to, 50 wt %.

In some examples, including any of the foregoing, the phosphorus electrolyte additive or combination of phosphorus electrolyte additives is present in the electrolyte at a concentration equal to, or greater than, about 0.05 weight percent (wt %) to less than, or equal to, 50 wt %.

In some examples, including any of the foregoing, the phosphorus electrolyte additive or combination of phosphorus electrolyte additives is present in the electrolyte at a concentration equal to, or greater than, about 0.1 weight percent (wt %) to less than, or equal to, 50 wt %.

In some examples, including any of the foregoing, the phosphorus electrolyte additive or combination of phosphorus electrolyte additives is present in the electrolyte at a concentration equal to, or greater than, about 0.5 weight percent (wt %) to less than, or equal to, 50 wt %.

In some examples, including any of the foregoing, the phosphorus electrolyte additive or combination of phosphorus electrolyte additives is present in the electrolyte at a concentration equal to, or greater than, about 1 weight percent (wt %) to less than, or equal to, 50 wt %.

In some examples, including any of the foregoing, the phosphorus electrolyte additive or combination of phosphorus electrolyte additives is present in the electrolyte at a concentration equal to, or greater than, about 5 weight percent (wt %) to less than, or equal to, 50 wt %.

In some examples, including any of the foregoing, the phosphorus electrolyte additive or combination of phosphorus electrolyte additives is present in the electrolyte at a concentration equal to, or greater than, about 10 weight percent (wt %) to less than, or equal to, 50 wt %.

In some examples, including any of the foregoing, the phosphorus electrolyte additive or combination of phosphorus electrolyte additives is present in the electrolyte at a concentration equal to, or greater than, about 15 weight percent (wt %) to less than, or equal to, 50 wt %.

In some examples, including any of the foregoing, the phosphorus electrolyte additive or combination of phosphorus electrolyte additives is present in the electrolyte at a concentration equal to, or greater than, about 20 weight percent (wt %) to less than, or equal to, 50 wt %.

In some examples, including any of the foregoing, the phosphorus electrolyte additive or combination of phosphorus electrolyte additives is present in the electrolyte at a concentration equal to, or greater than, about 30 weight percent (wt %) to less than, or equal to, 50 wt %.

In some examples, including any of the foregoing, the phosphorus electrolyte additive or combination of phosphorus electrolyte additives is present in the electrolyte at a concentration equal to, or greater than, about 40 weight percent (wt %) to less than, or equal to, 50 wt %.

In some examples, including any of the foregoing, the phosphorus electrolyte additive or combination of phosphorus electrolyte additives is present in the electrolyte at a concentration equal to, or greater than, about 0.001 weight percent (wt %) to less than, or equal to, 40 wt %.

In some examples, including any of the foregoing, the phosphorus electrolyte additive or combination of phosphorus electrolyte additives is present in the electrolyte at a concentration equal to, or greater than, about 0.001 weight percent (wt %) to less than, or equal to, 35 wt %.

In some examples, including any of the foregoing, the phosphorus electrolyte additive or combination of phosphorus electrolyte additives is present in the electrolyte at a concentration equal to, or greater than, about 0.001 weight percent (wt %) to less than, or equal to, 30 wt %.

In some examples, including any of the foregoing, the phosphorus electrolyte additive or combination of phosphorus electrolyte additives is present in the electrolyte at a concentration equal to, or greater than, about 1 weight percent (wt %) to less than, or equal to, 30 wt %.

In some examples, including any of the foregoing, the phosphorus electrolyte additive or combination of phosphorus electrolyte additives is present in the electrolyte at a concentration equal to, or greater than, about 0.001 weight percent (wt %) to less than, or equal to, 20 wt %.

In some examples, including any of the foregoing, the phosphorus electrolyte additive or combination of phosphorus electrolyte additives is present in the electrolyte at a concentration equal to, or greater than, about 0.001 weight percent (wt %) to less than, or equal to, 15 wt %.

In some examples, including any of the foregoing, the phosphorus electrolyte additive or combination of phosphorus electrolyte additives is present in the electrolyte at a concentration equal to, or greater than, about 0.001 weight percent (wt %) to less than, or equal to, 10 wt %.

In some examples, including any of the foregoing, the phosphorus electrolyte additive or combination of phosphorus electrolyte additives is present in the electrolyte at a concentration equal to, or greater than, about 0.001 weight percent (wt %) to less than, or equal to, 5 wt %.

In some examples, including any of the foregoing, the phosphorus electrolyte additive or combination of phosphorus electrolyte additives is present in the electrolyte at a concentration equal to, or greater than, about 0.001 weight percent (wt %) to less than, or equal to, 1 wt %.

In some examples, including any of the foregoing, the phosphorus electrolyte additive or combination of phosphorus electrolyte additives is present in the electrolyte at a concentration equal to, or greater than, about 0.001 weight percent (wt %) to less than, or equal to, 0.5 wt %.

In some examples, including any of the foregoing, the phosphorus electrolyte additive or combination of phosphorus electrolyte additives is present in the electrolyte at a concentration equal to, or greater than, about 0.001 weight percent (wt %) to less than, or equal to, 0.05 wt %.

In some examples, including any of the foregoing, the phosphorus electrolyte additive or combination of phosphorus electrolyte additives is present in the electrolyte at a concentration equal to, or greater than, about 0.001 weight percent (wt %) to less than, or equal to, 0.1 wt %.

In some examples, including any of the foregoing, the phosphorus electrolyte additive or combination of phosphorus electrolyte additives is present in the electrolyte at a concentration equal to, or greater than, about 0.001 weight percent (wt %) to less than, or equal to, 0.05 wt %.

In other examples, including any of the foregoing, the phosphorus electrolyte additive or combination of phosphorus electrolyte additives is present in the electrolyte at a concentration equal to, or greater than, about 0.1 weight percent (wt %) to less than, or equal to, 35 wt %.

In other examples, including any of the foregoing, the phosphorus electrolyte additive or combination of phosphorus electrolyte additives is present in the electrolyte at a concentration equal to, or greater than, about 0.1 weight percent (wt %) to less than, or equal to, 30 wt %.

In other examples, including any of the foregoing, the phosphorus electrolyte additive or combination of phosphorus electrolyte additives is present in the electrolyte at a concentration equal to, or greater than, about 0.1 weight percent (wt %) to less than, or equal to, 25 wt %.

In other examples, including any of the foregoing, the phosphorus electrolyte additive or combination of phosphorus electrolyte additives is present in the electrolyte at a concentration equal to, or greater than, about 0.1 weight percent (wt %) to less than, or equal to, 15 wt %.

In other examples, including any of the foregoing, the phosphorus electrolyte additive or combination of phosphorus electrolyte additives is present in the electrolyte at a concentration equal to, or greater than, about 0.1 weight percent (wt %) to less than, or equal to, 10 wt %.

In other examples, including any of the foregoing, the phosphorus electrolyte additive or combination of phosphorus electrolyte additives is present in the electrolyte at a concentration equal to, or greater than, about 0.5 weight percent (wt %) to less than, or equal to, 5 wt %.

In other examples, including any of the foregoing, the phosphorus electrolyte additive or combination of phosphorus electrolyte additives is present in the electrolyte at a concentration equal to, or greater than, about 0.5 weight percent (wt %) to less than, or equal to, 3 wt %.

In other examples, including any of the foregoing, the phosphorus electrolyte additive or combination of phosphorus electrolyte additives is present in the electrolyte at a concentration equal to, or greater than, about 0.5 weight percent (wt %) to less than, or equal to, 1 wt %.

In other examples, including any of the foregoing, the phosphorus electrolyte additive or combination of phosphorus electrolyte additives is present in the electrolyte at a concentration equal to, or greater than, about 0.5 weight percent (wt %) to less than, or equal to, 1.5 wt %.

In other examples, including any of the foregoing, the phosphorus electrolyte additive or combination of phosphorus electrolyte additives is present in the electrolyte at a concentration equal to, or greater than, about 0.01 weight percent (wt %) to less than, or equal to, 0.5 wt %.

In other examples, including any of the foregoing, the phosphorus electrolyte additive or combination of phosphorus electrolyte additives is present in the electrolyte at a concentration equal to, or greater than, about 0.1 weight percent (wt %) to less than, or equal to, 0.5 wt %.

In other examples, including any of the foregoing, the phosphorus electrolyte additive or combination of phosphorus electrolyte additives is present in the electrolyte at a concentration equal to, or greater than, about 1 weight percent (wt %) to less than, or equal to, 5 wt %.

In other examples, including any of the foregoing, the phosphorus electrolyte additive or combination of phosphorus electrolyte additives is present in the electrolyte at a concentration equal to, or greater than, about 1 weight percent (wt %) to less than, or equal to, 2 wt %.

In other examples, including any of the foregoing, the phosphorus electrolyte additive or combination of phosphorus electrolyte additives is present in the electrolyte at a concentration equal to, or greater than, about 0.001 weight percent (wt %) to less than, or equal to, 0.05 wt %.

In other examples, including any of the foregoing, the phosphorus electrolyte additive or combination of phosphorus electrolyte additives is present in the electrolyte at a concentration equal to, or greater than, about 0.001 weight percent (wt %) to less than, or equal to, 0.5 wt %.

In other examples, including any of the foregoing, the phosphorus electrolyte additive or combination of phosphorus electrolyte additives is present in the electrolyte at a concentration equal to, or greater than, about 0.01 weight percent (wt %) to less than, or equal to, 0.5 wt %.

In other examples, including any of the foregoing, the phosphorus electrolyte additive or combination of phosphorus electrolyte additives is present in the electrolyte at a concentration equal to, or greater than, about 0.01 weight percent (wt %) to less than, or equal to, 1 wt %.

In some examples, including any of the foregoing, the phosphorus electrolyte additive or combination of phosphorus electrolyte additives is present in the electrolyte at a concentration of about 50 weight percent (wt %).

In some examples, including any of the foregoing, the phosphorus electrolyte additive or combination of phosphorus electrolyte additives is present in the electrolyte at a concentration of about 40 weight percent (wt %).

In some examples, including any of the foregoing, the phosphorus electrolyte additive or combination of phosphorus electrolyte additives is present in the electrolyte at a concentration of about 30 weight percent (wt %).

In some examples, including any of the foregoing, the phosphorus electrolyte additive or combination of phosphorus electrolyte additives is present in the electrolyte at a concentration of about 25 weight percent (wt %).

In some examples, including any of the foregoing, the phosphorus electrolyte additive or combination of phosphorus electrolyte additives is present in the electrolyte at a concentration of about 20 weight percent (wt %).

In some examples, including any of the foregoing, the phosphorus electrolyte additive or combination of phosphorus electrolyte additives is present in the electrolyte at a concentration of about 15 weight percent (wt %).

In some examples, including any of the foregoing, the phosphorus electrolyte additive or combination of phosphorus electrolyte additives is present in the electrolyte at a concentration of about 10 weight percent (wt %).

In some examples, including any of the foregoing, the phosphorus electrolyte additive or combination of phosphorus electrolyte additives is present in the electrolyte at a concentration of about 5 weight percent (wt %).

In some examples, including any of the foregoing, the phosphorus electrolyte additive or combination of phosphorus electrolyte additives is present in the electrolyte at a concentration of about 4 weight percent (wt %).

In some examples, including any of the foregoing, the phosphorus electrolyte additive or combination of phosphorus electrolyte additives is present in the electrolyte at a concentration of about 3 weight percent (wt %).

In some examples, including any of the foregoing, the phosphorus electrolyte additive or combination of phosphorus electrolyte additives is present in the electrolyte at a concentration of about 2 weight percent (wt %).

In some examples, including any of the foregoing, the phosphorus electrolyte additive or combination of phosphorus electrolyte additives is present in the electrolyte at a concentration of about 1.5 weight percent (wt %).

In some examples, including any of the foregoing, the phosphorus electrolyte additive or combination of phosphorus electrolyte additives is present in the electrolyte at a concentration of about 1 weight percent (wt %).

In some examples, including any of the foregoing, the phosphorus electrolyte additive or combination of phosphorus electrolyte additives is present in the electrolyte at a concentration less than 0.5 weight percent (wt %).

In some examples, including any of the foregoing, the phosphorus electrolyte additive or combination of phosphorus electrolyte additives is present in the electrolyte at a concentration of about 0.5 weight percent (wt %).

In some examples, including any of the foregoing, the phosphorus electrolyte additive or combination of phosphorus electrolyte additives is present in the electrolyte at a concentration of about 0.1 weight percent (wt %).

In some examples, including any of the foregoing, the phosphorus electrolyte additive or combination of phosphorus electrolyte additives is present in the electrolyte at a concentration of about 0.05 weight percent (wt %).

In some examples, including any of the foregoing, the phosphorus electrolyte additive or combination of phosphorus electrolyte additives is present in the electrolyte at a concentration of about 0.01 weight percent (wt %).

In some examples, including any of the foregoing, the phosphorus electrolyte additive or combination of phosphorus electrolyte additives is present in the electrolyte at a concentration of about 0.005 weight percent (wt %).

In some examples, including any of the foregoing, the phosphorus electrolyte additive or combination of phosphorus electrolyte additives is present in the electrolyte at a concentration of about 0.001 weight percent (wt %).

In one embodiment, the aqueous electrolyte comprises two or more electrolyte additives and the concentration of each additive is between about 0.001 wt % and 10 wt %. In one embodiment, the aqueous electrolyte comprises two or more electrolyte additives and the combined concentration of the two or more additives is between about 0.001 wt % and 10 wt %.

In one embodiment, the aqueous electrolyte comprises two or more electrolyte additives and the concentration of each additive is between about 0.5 wt % and 5 wt %. In one embodiment, the aqueous electrolyte comprises two or more electrolyte additives and the combined concentration of the two or more additives is between about 0.5 wt % and 5 wt %.

In one embodiment, the aqueous electrolyte comprises two or more electrolyte additives and the concentration of each additive is between about 0.1 wt % and 1 wt %. In one embodiment, the aqueous electrolyte comprises two or more electrolyte additives and the combined concentration of the two or more additives is between about 0.1 wt % and 1 wt %.

In one embodiment, the aqueous electrolyte comprises two or more electrolyte additives and the concentration of each additive is between about 0.001 wt % and 0.5 wt %. In one embodiment, the aqueous electrolyte comprises two or more electrolyte additives and the combined concentration of the two or more additives is between about 0.001 wt % and 0.5 wt %.

In one embodiment, the aqueous electrolyte comprises two or more electrolyte additives and the concentration of each additive is about 10 wt %. In one embodiment, the aqueous electrolyte comprises two or more electrolyte additives and the combined concentration of the two or more additives is about 10 wt %.

In one embodiment, the aqueous electrolyte comprises two or more electrolyte additives and the concentration of each additive is about 5 wt %. In one embodiment, the aqueous electrolyte comprises two or more electrolyte additives and the combined concentration of the two or more additives is about 5 wt %.

In one embodiment, the aqueous electrolyte comprises two or more electrolyte additives and the concentration of each additive is about 1 wt %. In one embodiment, the aqueous electrolyte comprises two or more electrolyte additives and the combined concentration of the two or more additives is about 1 wt %.

In one embodiment, the aqueous electrolyte comprises two or more electrolyte additives and the concentration of each additive is about 0.5 wt %. In one embodiment, the aqueous electrolyte comprises two or more electrolyte additives and the combined concentration of the two or more additives is about 0.5 wt %.

In one embodiment, the aqueous electrolyte comprises two or more electrolyte additives and the concentration of each additive is about 0.1 wt %. In one embodiment, the aqueous electrolyte comprises two or more electrolyte additives and the combined concentration of the two or more additives is about 0.1 wt %.

In one embodiment, the aqueous electrolyte comprises two or more electrolyte additives and the concentration of each additive is about 0.01 wt %. In one embodiment, the aqueous electrolyte comprises two or more electrolyte additives and the combined concentration of the two or more additives is about 0.01 wt %.

In one embodiment, the aqueous electrolyte comprises two or more electrolyte additives and the concentration of each additive is about 0.001 wt %. In one embodiment, the aqueous electrolyte comprises two or more electrolyte additives and the combined concentration of the two or more additives is about 0.001 wt %.

In some examples, including any of the foregoing, the phosphorus electrolyte additive is of Formula P-I or Formula I-1 wherein $R^1$ and $R^2$ are independently selected from —OH and phenyl and $R^3$ is H and the additive is present in the electrolyte at a concentration of about 0.001 weight percent (wt %) to 0.5 weight percent (wt %).

In some examples, including any of the foregoing, set forth herein is a zinc-battery or electrochemical cell comprising at least one electrolyte additive as set forth herein. In one embodiment, the battery comprises an anode wherein the anode is a metallic element, including but not limited to, zinc. In one embodiment, the battery comprises a zinc anode.

In some examples, including any of the foregoing, set forth herein is an electrochemical cell comprising an anode wherein the anode is a metallic element; a cathode selected from oxygen, lithium, carbon, cerium, chloride, bromide, iodide, iron, manganese dioxide, nickel, and silver oxide; and an aqueous electrolyte as set forth herein. In some examples, the anode is zinc.

In some examples, including any of the foregoing, set forth herein is an electrochemical cell comprising a zinc anode paired with a cathode of any of the following: lithium, carbon, chloride, bromide, iron, manganese dioxide, iodide, nickel, air, and silver oxide; and at least one phosphate electrolyte additive as set forth herein. In certain embodiments, the electrochemical cell comprises an anode selected from zinc-lithium, zinc-carbon, zinc-chloride, zinc-bromide, zinc-air, zinc-iron, zinc-manganese dioxide, zinc-iodide, zinc-nickel, or zinc-silver oxide; and at least one phosphate electrolyte additive as set forth herein.

In some examples, the zinc-battery comprises an aqueous electrolyte that comprises at least one additive as set forth herein and further comprises potassium hydroxide (KOH). In one embodiment, the pH of the aqueous electrolyte is about 8 to 13. In one embodiment, the pH of the aqueous electrolyte is about 10.

In some examples, the zinc-battery comprises an aqueous electrolyte that comprises at least one additive as set forth herein and further comprises zinc (II) sulfate.

III. PROCESS FOR MAKING

In some examples, set forth herein is a process for making a zinc battery, comprising contacting an aqueous electrolyte comprising an additive set forth herein with a zinc-battery electrode.

In some examples, including any of the foregoing, the zinc-battery comprises a positive electrode.

In some examples, including any of the foregoing, the zinc-battery comprises a negative electrode.

In some examples, including any of the foregoing, the negative electrode is selected from zinc foil, zinc powder, porous zinc, electroplated zinc, zinc alloy, or a combination thereof. In certain examples, the negative electrode is zinc foil. In certain examples, the negative electrode is zinc powder. In certain examples, the negative electrode is porous zinc. In certain other examples, the negative electrode is electroplated zinc. In certain examples, the negative electrode is zinc alloy. In certain examples, the negative electrode is a combination thereof zinc foil, zinc powder, porous zinc, electroplated zinc, and zinc alloy.

IV. METHODS FOR USING

Also described herein is a method of reducing or eliminating self-discharge and/or preventing hydrogen production, comprising:
  providing an electrochemical cell comprising:
    (1) a zinc-lithium, zinc-carbon, zinc-chloride, zinc-bromide, zinc-air, zinc-iron, zinc-manganese dioxide, zinc-iodide, zinc-nickel, or zinc-silver oxide anode; and
    (2) an aqueous electrolyte comprising KOH and at least one electrolyte additive described here; and
  wherein the electrochemical cell is charged to 0.5 V or greater; and
  storing the electrochemical cell at 0° to 120° C. for at least one day;
  wherein the electrochemical cell voltage does not reduce by more than 10% during the storing.

In an alternative embodiment, the aqueous electrolyte comprises zinc (II) sulfate and at least one electrolyte additive described here.

In one embodiment, the electrochemical cell is charged to 1.0 V or greater.

In one embodiment, the electrochemical cell is charged to 1.5 V or greater.

In one embodiment, the electrochemical cell voltage does not reduce more than 8% during the storing.

In one embodiment, the electrochemical cell voltage does not reduce more than 5% during the storing.

V. EXAMPLES

Chemicals were commercially purchased unless stated explicitly otherwise.

Example 1-Effect of Phosphate Additives on Gas Formation

An electrolyte was created by mixing 10 milliliters of type I deionized water (measured to 18.2 megaohm [1,000Ω] resistance) with a mass of potassium hydroxide of either 3.09 grams (to create a 5.5 molar solution) or 4.48 grams (to create an 8.0 molar solution). An amount of additive was then added to the solution to achieve the concentrations listed in Tables 1A, 1B, IC, and ID. The electrolyte was then transferred to a 20-milliliter glass vial and 5 grams of dry zinc metal powder was added. The vial was then sealed using a cap with a Teflon septum and the cap was sealed using tape and vacuum grease. A plastic disposable syringe was inserted into the vial with a stainless-steel needle to measure the volume change of the vial. The vial was then held in an oven in ambient atmosphere and 60 degrees Celsius for fourteen days. The volume change (mL) was measured as displacement of the syringe plunger and assumed to be the gas generated from the electrolyte. The gas volume for the electrolytes made with 5.5 M KOH is shown in Table 1A and the gas volume for the electrolytes made with 8.0 M KOH is shown in Table 1B. In Table 1A and Table 1B, ** is 2 mL or greater; * is greater than, or equal to, 1 mL but less than 2 mL; ** is greater than, or equal to, 0.5 mL but less than 1 mL; and * is less than 0.5 mL. As shown in Table 1A, the electrolyte made with 5.5 M of KOH and no additives produced a gas volume that was 2 mL or greater, but the addition of any additive from Table 1A lead to a production of gas volume that was less than 2 mL. All the representative additives shown in Table IA produced less hydrogen gas compared to the electrolyte with no additive.

Similarly, as shown in Table 1B, the electrolyte made with 8.0 M of KOH and no additives produced a gas volume that was less than 2 mL, but greater than or equal to 1 mL. However, when a representative additive of Table 1B was added to the electrolyte, the gas production was reduced compared to the electrolyte with no additive. The gas production of the representative additives of Table 1B was greater than, or equal to, 0.5 mL, but less than 1 mL.

TABLE 1A

Gas volumes observed from zinc metal in electrolyte made with 5.5 M KOH after 14 days at 60° C. when various additives are present

| Additive | Additive Concentration (wt %) | Gas volume (mL) |
|---|---|---|
| None | N/A | **** |
| Trimethyl phosphate | 0.01% | ** |
| Trimethyl phosphite | 0.01% | *** |
| Dimethyl phosphate | 0.01%<br>1% | <br> |
| Phenylphosphonic acid | 1% | ** |
| Phenylphosphinic acid | 0.01% | *** |
| Diethylphosphonoacetic acid | 0.01%<br>1% | *<br>* |
| 4-Hydroxymethyl-2,6,7-trioxa-1-phospha-bicyclo[2.2.2]octane 1-Oxide | 1% | *** |
| 9,10-Dihydro-9-oxa-10-phosphaphenanthrene 10-oxide | 0.01%<br>1% | <br> |
| 5,5-Dimethyl-1,3,2-dioxaphosphorinan-2-one | 0.01%<br>1% | <br> |

TABLE 1B

Gas volumes observed from zinc metal in electrolyte made with 8.0 M KOH after 14 days at 60° C. when various additives are present.

| Additive | Additive Concentration (wt %) | Gas volume (mL) |
|---|---|---|
|  | N/A | *** |
| Dimethyl phosphate | 1% | ** |
| [bicyclic phosphate structure with OH] | 1% | ** |
| 4-Hydroxymethyl-2,6,7-trioxa-1-phospha-bicyclo[2.2.2]octane 1-Oxide | | |

Additional data produced by an improved testing method that improved accuracy is shown in Table 1C and Table 1D. The gas volume for the electrolytes made with 5.5 M KOH is shown in Table 1C and the gas volume for the electrolytes made with 8.0 M KOH is shown in Table D. In Table 1C * is 1.5 mL or greater;  is greater than, or equal to, 0.5 mL but less than 1.5 mL;  is greater than, or equal to, 0.2 mL but less than 0.5 mL; and * is less than 0.2 mL. In Table D is greater than 0.5 mL; * is greater than, 0.25 mL but less than or equal to 0.5 mL;  is greater than 0.1 mL but less than or equal to 0.25 mL; and * is less than or equal to 0.1 mL. Certain compounds from Table 1A and 1B are repeated in Tables 1C and 1D, respectively.

TABLE 1C

Gas volumes observed from zinc metal in electrolyte made with 5.5 M KOH after 14 days at 60° C. when various additives are present

| Additive | Additive Concentration (wt %) | Gas volume (mL) |
|---|---|---|
| None | N/A | **** |
| Polyoxyethylene dinonylphenyl ether phosphate (industry standard) | 0.004% (solubility limit) | *** |
| Dimethyl Phosphate | 1% | * |
| Trimethyl Phosphate | 1% | ** |
| Trimethyl Phosphite | 1% | *** |
| Phenylphosphonic acid | 30% | ** |
|  | 1% | ** |
|  | 0.01% | * |

TABLE 1C-continued

Gas volumes observed from zinc metal in electrolyte made with 5.5 M KOH after 14 days at 60° C. when various additives are present

| Additive | Additive Concentration (wt %) | Gas volume (mL) |
|---|---|---|
| 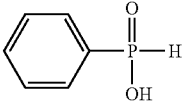<br>Phenylphosphinic acid | 20%<br>1%<br>0.01%<br>0.005% | *<br>*<br>*<br>* |
| 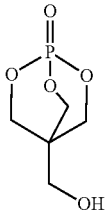 [SMILES: O=P12OCC(CO)(CO1)CO2]<br>4-Hydroxymethyl-2,6,7-trioxa-1-phospha-bicyclo[2.2.2]octane 1-Oxide | 10%<br>1%<br>0.01%<br>0.001% | <br><br><br> |
| 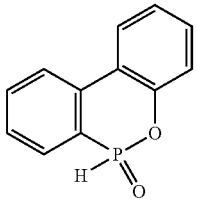 [SMILES: O=[PH]1Oc2ccccc2-c2ccccc21]<br>9,10-Dihydro-9-oxa-10-phosphaphenanthrene 10-oxide | 0.01%<br>15% | **<br>* |
| 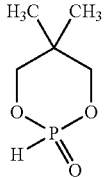<br>5,5-Dimethyl-1,3,2-dioxaphosphorinan-2-one | 0.1%<br>0.01%<br>0.01% | *<br>*<br>*** |
| 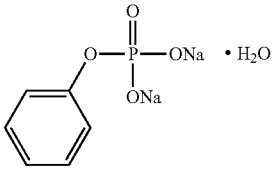<br>Phenyl phosphate disodium salt dihydrate | 1% | ** |
| 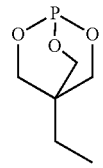<br>Trimethylolpropane Phosphite | 0.01%<br>1% | *<br>*** |

TABLE 1C-continued

Gas volumes observed from zinc metal in electrolyte made with 5.5 M KOH after 14 days at 60° C. when various additives are present

| Additive | Additive Concentration (wt %) | Gas volume (mL) |
|---|---|---|
| Dibenzyl phosphate | 0.01%<br>1% | ***<br>* |
| 6-(2,5-Dihydroxyphenyl)-6H-dibenz[c,e][1,2]oxaphosphorine-6-oxide | 0.01%<br>0.001%<br>0.1% | *<br>*<br>*** |
| Bis(2,4-di-tert-butylphenyl)-pentaerythritol diphosphite | 10% | *** |
| (2-Carboxyethyl) phenylphosphinic acid | 0.1%<br>0.001%<br>0.1% | ***<br>*<br>*<br>* |
| Ethyl phenylphosphinate | 1% | * |
| 3,9-Bis(octadecyloxy)-2,4,8,10-tetraoxa-3,9-diphosphaspiro[5.5]undecane | 0.1% | *** |

TABLE 1C-continued

Gas volumes observed from zinc metal in electrolyte made with 5.5 M KOH after 14 days at 60° C. when various additives are present

| Additive | Additive Concentration (wt %) | Gas volume (mL) |
|---|---|---|
| 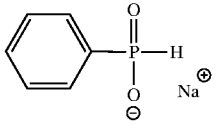 Phenylphosphinic acid (Sodium) | | |

TABLE 1D

Gas volumes observed from zinc metal in electrolyte made with 8.0 M KOH after 14 days at 60° C. when various additives are present.

| Additive | Additive Concentration (wt %) | Gas volume (mL) |
|---|---|---|
| None | N/A | **** |
| 4-Hydroxymethyl-2,6,7-trioxa-1-phospha-bicyclo[2.2.2]octane 1-Oxide | 1% | * |
| Phenylphosphinic Acid | 1% | * |
| 9,10-Dihydro-9-oxa-10-phosphaphenanthrene 10-Oxide | 1% | * |
| 5,5-Dimethyl-1,3,2-dioxaphosphorinan-2-one | 1% | *** |

Example 2—Effect of Phosphorous Additives on Corrosion Inhibition Efficiency The control electrolyte was created by mixing 60 mL of type I deionized water (measured to 18.2 megaohm [1,000Ω] resistance) with either 18.5 g of potassium hydroxide (KOH) (to create a 5.5 molar solution), 26.9 g of potassium hydroxide (to create an 8.0 molar solution), or 21.5 g of zinc sulfate monohydrate (to create a 2.0 molar solution), and 0.486 g of zinc oxide (ZnO). To the control electrolyte, an amount of additive was then added to the solution to achieve the concentrations listed in Tables 2A, 2B, and 2C. The resulting electrolyte was sparged using industrial grade nitrogen for 45 minutes. To determine the effectiveness of the additive in suppressing the corrosion of zinc in the KOH electrolyte, Tafel scans were performed using an electrochemical cell in a three-electrode configuration. Experiments were performed both in the presence and absence of the additive. A 1 mm diameter Zn wire (99.95% purity, Thermo Scientific), coated with AquaMend underwater repair epoxy was used as the working electrode (WE). Prior to each experiment the tip of epoxy coated zinc wire WEs were sanded with 1000 grit sandpaper, then polished with 5 μm alumina slurry (Aztron Technologies) on a terry cloth polishing pad (Grainger). A Hg/HgO electrode filled with 4.24 molar KOH was used as the reference electrode ($E_{Hg/HgO}$+0.098 V vs Normal Hydrogen Electrode (NHE)). A 0.5 mm diameter platinum wire (Sigma-Aldrich) was used as the counter electrode. All electrochemical measurements were performed with BioLogic SP-300 potentiostat at room temperature. The corrosion inhibition efficiency ($\eta_p$) of the additive was given as $$\eta_p = \frac{i_{corr} - i'_{corr}}{i_{corr}}, \quad \text{(Eq. 1)}$$

where, $i_{corr}$ and $i'_{corr}$ were the corrosion current densities of zinc with and without the additive in the electrolyte. For Tables 2A, 2B and 2C, **** is less than 20%, * is greater than 20% but less than or equal to 40%, ** is greater than 40% but less than or equal to 60%, and * is greater than 60%.

Example 2A. Effect of 9,10-Dihydro-9-Oxa-10-Phosphaphenanthrene-10-Oxide (100 ppm) on Corrosion Inhibition Efficiency The control electrolyte was created by mixing 60 ml of type I deionized water (measured to 18.2 megaohm resistance) with 18.5 g of potassium hydroxide (KOH) and 0.486 g of zinc oxide (ZnO). To the control electrolyte, 6 mg of 9,10-dihydro-9-oxa-10-phosphaphenanthrene 10-oxide was added. The resulting electrolyte was sparged using industrial grade nitrogen for 45 minutes. To determine the effectiveness of the additive in suppressing the corrosion of zinc in the KOH electrolyte, Tafel scans were performed using an electrochemical cell in a three-electrode configuration. Experiments were performed both in the presence and absence of the additive. A 1 mm diameter Zn wire (99.95% purity, Thermo Scientific), coated with AquaMend underwater repair epoxy was used as the working electrode (WE). Prior to each experiment the tip of epoxy coated zinc wire WEs were sanded with 1000 grit sandpaper, then polished with 5 μm alumina slurry (Aztron Technologies) on a terry cloth polishing pad (Grainger). A Hg/HgO electrode filled with 4.24 molar KOH was used as the reference electrode ($E_{Hg/HgO}$=+0.098 V vs Normal Hydrogen Electrode (NHE)). A 0.5 mm diameter platinum wire (Sigma-Aldrich) was used as the counter electrode. All electrochemical measurements were performed with BioLogic SP-300 potentiostat at room temperature. The corrosion inhibition efficiency ($\eta_p$) of the additive was given as $$\eta_p = \frac{i_{corr} - i'_{corr}}{i_{corr}}, \quad \text{(Eq. 1)}$$

where, $i_{corr}$ and $i'_{corr}$ were the corrosion current densities of zinc with and without the additive in the electrolyte. At 100 parts per million (ppm) additive concentration, $\eta_p$ for 9,10-Dihydro-9-oxa-10-phosphaphenanthrene 10-oxide is shown in Table 2A.

Example 2B. Effect of 4-Hydroxymethyl-2,6,7-Trioxa-1-Phosphabicyclo[2.2.2] Octane 1-Oxide (1%) on Corrosion Inhibition Efficiency The control electrolyte was created by mixing 60 ml of type I deionized water (measured to 18.2 megaohm resistance) with 18.5 g of potassium hydroxide (KOH) and 0.486 g of zinc oxide (ZnO). To the control electrolyte, 0.6 g of 4-Hydroxymethyl-2,6,7-trioxa-1-phosphabicyclo[2.2.2] octane 1-oxide was added. The resulting electrolyte was sparged using industrial grade nitrogen for 45 minutes. To determine the effectiveness of the additive in suppressing the corrosion of zinc in the KOH electrolyte, Tafel scans were performed using an electrochemical cell in a three-electrode configuration. Experiments were performed both in the presence and absence of the additive. A 1 mm diameter Zn wire (99.95% purity, Thermo Scientific), coated with Aqua-Mend underwater repair epoxy was used as the working electrode (WE). Prior to each experiment the tip of epoxy coated zinc wire WEs were sanded with 1000 grit sandpaper, then polished with 5 μm alumina slurry (Aztron Technologies) on a terry cloth polishing pad (Grainger). A Hg/HgO electrode filled with 4.24 molar KOH was used as the reference electrode ($E_{Hg/HgO}$=+0.098 V vs Normal Hydrogen Electrode (NHE)). A 0.5 mm diameter platinum wire (Sigma-Aldrich) was used as the counter electrode. All electrochemical measurements were performed with BioLogic SP-300 potentiostat at room temperature. The corrosion inhibition efficiency ($\eta_p$) of the additive was given as in Equation 1. At 1% additive concentration, $\eta_p$ for 4-Hydroxymethyl-2,6,7-trioxa-1-phosphabicyclo[2.2.2]octane 1-oxide was measured as in Table 2A.

Example 2C. Effect of Ethyl Phenylphosphinate (1000 ppm) on Corrosion Inhibition Efficiency The control electrolyte was created by mixing 60 ml of type I deionized water (measured to 18.2 megaohm resistance) with 18.5 g of potassium hydroxide (KOH) and 0.486 g of zinc oxide (ZnO). To the control electrolyte, 0.06 g of ethyl phenylphosphinate was added. The resulting electrolyte was sparged using industrial grade nitrogen for 45 minutes. To determine the effectiveness of the additive in suppressing the corrosion of zinc in the KOH electrolyte, Tafel scans were performed using an electrochemical cell in a three-electrode configuration. Experiments were performed both in the presence and absence of the additive. A 1 mm diameter Zn wire (99.95% purity, Thermo Scientific), coated with AquaMend underwater repair epoxy was used as the working electrode (WE). Prior to each experiment the tip of epoxy coated zinc wire WEs were sanded with 1000 grit sandpaper, then polished with 5 μm alumina slurry (Aztron Technologies) on a terry cloth polishing pad (Grainger). A Hg/HgO electrode filled with 4.24 molar KOH was used as the reference electrode ($E_{Hg/HgO}$=+0.098 V vs Normal Hydrogen Electrode (NHE)). A 0.5 mm diameter platinum wire (Sigma-Aldrich) was used as the counter electrode. All electrochemical measurements were performed with BioLogic SP-300 potentiostat at room temperature. The corrosion inhibition efficiency ($\eta_p$) of the additive was given as in Equation 1. At 1000 parts per million (ppm) additive concentration, $\eta_p$, for ethyl phenylphosphinate was measured as shown in Table 2A.

Example 2D. Effect of 5,5-Dimethyl-1,3,2-Dioxaphosphorinan-2-One (1%) on Corrosion Inhibition Efficiency The control electrolyte was created by mixing 60 ml of type I deionized water (measured to 18.2 megaohm resistance) with 26.88 g of potassium hydroxide (KOH) and 0.486 g of zinc oxide (ZnO). To the control electrolyte, 0.6 g of 5,5-Dimethyl-1,3,2-dioxaphosphorinan-2-one was added. The resulting electrolyte was sparged using industrial grade nitrogen for 45 minutes. To determine the effectiveness of the additive in suppressing the corrosion of zinc in the KOH electrolyte, Tafel scans were performed using an electrochemical cell in a three-electrode configuration. Experiments were performed both in the presence and absence of the additive. A 1 mm diameter Zn wire (99.95% purity, Thermo Scientific), coated with AquaMend underwater repair epoxy was used as the working electrode (WE). Prior to each experiment the tip of epoxy coated zinc wire WEs were sanded with 1000 grit sandpaper, then polished with 5 μm alumina slurry (Aztron Technologies) on a terry cloth polishing pad (Grainger). A Hg/HgO electrode filled with 4.24 molar KOH was used as the reference electrode ($E_{Hg/HgO}$=+0.098 V vs Normal Hydrogen Electrode (NHE)). A 0.5 mm diameter platinum wire (Sigma-Aldrich) was used as the counter electrode. All electrochemical measurements were performed with BioLogic SP-300 potentiostat at room temperature. The corrosion inhibition efficiency ($\eta_p$) of the additive was given as in Equation 1. At 1% additive concentration, $\eta_p$ for 5,5-Dimethyl-1,3,2-dioxaphosphorinan-2-one was measured as shown in Table 2A.

Example 2E. Effect of 4-Hydroxymethyl-2,6,7-Trioxa-1-Phosphabicyclo[2.2.2] Octane 1-Oxide (1%) on Corrosion Inhibition Efficiency The control electrolyte was created by mixing 60 ml of type I deionized water (measured to 18.2 megaohm with 21.5 g of zinc sulfate mono hydrate (ZnSO$_4$). To the control electrolyte, 0.6 g of 4-Hydroxymethyl-2,6,7-trioxa-1-phosphabicyclo[2.2.2]octane 1-oxide was added. The resulting electrolyte was sparged using industrial grade nitrogen for 45 minutes. To determine the effectiveness of the additive in suppressing the corrosion of zinc in the ZnSO$_4$ electrolyte, Tafel scans were performed using an electrochemical cell in a three-electrode configuration. Experiments were performed both in the presence and absence of the additive. A 1 mm diameter Zn wire (99.95% purity, Thermo Scientific), coated with AquaMend underwater repair epoxy was used as the working electrode (WE). Prior to each experiment the tip of epoxy coated zinc wire WEs were sanded with 1000 grit sandpaper, then polished with 5 μm alumina slurry (Aztron Technologies) on a terry cloth polishing pad (Grainger). An Ag/AgCl electrode filled with 4 molar potassium chloride (KCl) gel was used as the reference electrode ($E_{Ag/AgCl}$=+ 0.199 V vs Normal Hydrogen Electrode (NHE)). A 0.5 mm diameter platinum wire (Sigma-Aldrich) was used as the counter electrode. All electrochemical measurements were performed with BioLogic SP-300 potentiostat at room temperature. The corrosion inhibition efficiency ($\eta_p$) of the additive was given as in Equation 1. At 1% additive concentration, $\eta_p$ for 4-hydroxymethyl-2,6,7-trioxa-1-phosphabicyclo[2.2.2]octane 1-oxide was measured as shown in Table 2C.

TABLE 2A

Corrosion inhibition efficiencies observed as defined above in electrolyte of 5.5 M KOH when various additives are present.

| Additive Name | Additive Concentration (wt %) | $\eta_p$ (%) |
| --- | --- | --- |
| None | | **** (0%) |
| Polyoxyethylene dinonylphenyl ether phosphate (industry standard) | 0.004% | *** |
| 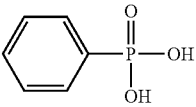<br>Phenylphosphonic Acid | 1%<br>0.01% | *<br> |
| 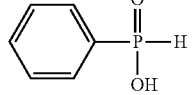<br>Phenylphosphinic Acid | 1%<br>0.01% | <br> |
| 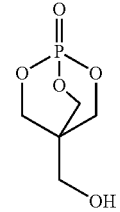<br>4-Hydroxymethyl-2,6,7-trioxa-1-phosphabicyclo [2.2.2] octane 1-Oxide | 1%<br>0.1%<br>0.001% | *<br><br>* |
| 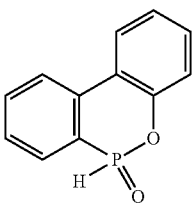 [SMILES: O=[PH]1Oc2ccccc2-c2ccccc21]<br>9,10-Dihydro-9-oxa-10-phosphaphenanthrene 10-Oxide | 20%<br>10%<br>1%<br>0.01% | *<br>*<br>*<br>** |

TABLE 2A-continued

Corrosion inhibition efficiencies observed as defined above in electrolyte of 5.5 M KOH when various additives are present.

| Additive Name | Additive Concentration (wt %) | $\eta_P$ (%) |
|---|---|---|
| 5,5-Dimethyl-1,3,2-dioxaphosphorinan-2-one | 1% <br> 0.1% <br> 0.01% | *** <br> * <br> ** |
| Phenyl phosphate disodium salt dihydrate | 1% | *** |
| Trimethylolpropane Phosphite | 0.1% | *** |
| Dibenzyl phosphate | 0.01% | ** |
| 6-(2,5-Dihydroxyphenyl)-6H-dibenz[c,e][1,2]oxaphosphorine-6-oxide | 0.01% <br> 1% | ** <br> *** |

TABLE 2A-continued

Corrosion inhibition efficiencies observed as defined above in electrolyte of 5.5 M KOH when various additives are present.

| Additive Name | Additive Concentration (wt %) | $\eta_p$ (%) |
|---|---|---|
| 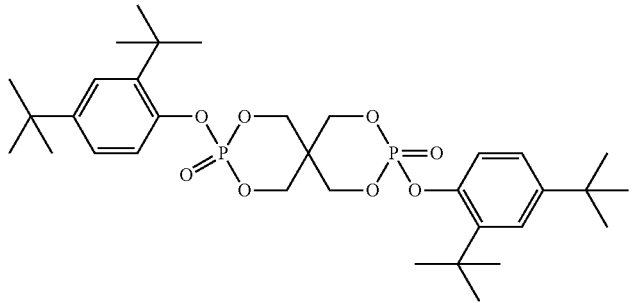 [SMILES: CC(C)(C)c1ccc(OP2(=O)OCC3(CO2)COP(=O)(Oc2ccc(C(C)(C)C)cc2C(C)(C)C)OC3)c(C(C)(C)C)c1]<br>Bis(2,4-di-tert-butylphenyl)-pentaerythritol diphosphate | 0.1% | * |
| 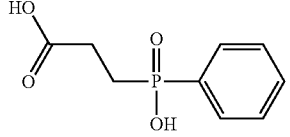 [SMILES: O=C(O)CCP(=O)(O)c1ccccc1]<br>(2-carboxyethyl)phenylphosphinic Acid | 0.1% | *** |
| 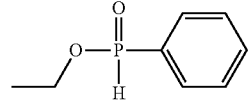<br>Ethyl phenylphosphinate | 0.1% |  |
| 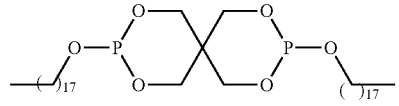<br>3,9-Bis(octadecyloxy)-2,4,8,10-tetraoxa-3,9-diphosphaspiro[5.5]undecane | 1% | *** |
| 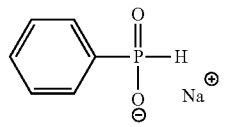<br>Phenylphosphinic acid (Sodium) | 0.1% | * |

TABLE 2B

Corrosion inhibition efficiencies observed as defined above in electrolyte of 8.0 M KOH when various additives are present.

| Additive Name | Additive Concentration (wt %) | $\eta_p$ (%) |
|---|---|---|
| None | | **** (0%) |
| Phenylphosphinic Acid | 1% | *** |
| 5,5-Dimethyl-1,3,2-dioxaphosphorinan-2-one | 1% | *** |

TABLE 2C

Corrosion inhibition efficiencies observed as defined above in electrolyte of 2.0 M Zinc (II) Sulfate when various additives are present.

| Additive Name | Additive Concentration (wt %) | $\eta_p$ (%) |
|---|---|---|
| None | | **** (0%) |
| 4-Hydroxymethyl-2,6,7-trioxa-1-phosphabicyclo[2.2.2]octane 1-Oxide | 1% | * |

The embodiments and examples described above are intended to be merely illustrative and non-limiting. Those skilled in the art will recognize or will be able to ascertain using no more than routine experimentation, numerous equivalents of specific compounds, materials and procedures. All such equivalents are considered to be within the scope and are encompassed by the appended claims.

What is claimed is:

1. An aqueous electrolyte comprising at least one electrolyte additive of Formula I:

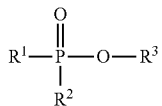

or a salt thereof, anion thereof, hydrolytic product thereof, or electrochemical reduction product thereof, wherein $R^1$ is $C_{6-10}$aryl optionally substituted with at least one $R^7$;

$R^2$ is selected from the group consisting of hydrogen, —OH, $C_{1-20}$alkoxy, —$C_{1-6}$alkyl-C(O)OR$^6$, hydroxy$C_{1-6}$alkyl, $C_{6-10}$aryl, $C_{6-10}$aryl$C_{1-6}$alkyl, $C_{6-10}$aryloxy, and $C_{6-10}$aryl$C_{1-6}$alkoxy, wherein the $C_{6-10}$aryl, either alone or as part of another group, is optionally substituted with at least one $R^7$; and $R^3$ is hydrogen, $C_{1-6}$alkyl, hydroxy$C_{1-6}$alkyl, $C_{6-10}$aryl, or $C_{6-10}$aryl$C_{1-6}$alkyl, wherein the $C_{6-10}$aryl or the $C_{6-10}$aryl$C_{1-6}$alkyl is optionally substituted with at least one $R^7$;

$R^6$ is hydrogen or $C_{1-6}$alkyl;

$R^7$ is independently selected from the group consisting of $C_{1-6}$alkyl, —OH, and hydroxy$C_{1-6}$alkyl, and wherein $R^7$ is not further substituted;

wherein the aqueous electrolyte optionally further comprises an ion selected from the group consisting of Na$^+$, K$^+$, Ca$^{2+}$, Zn$^{2+}$, a quaternary ammonium cation, and combinations thereof, and wherein the aqueous electrolyte has a pH greater than about 7;

wherein the at least one electrolyte additive is present in a solvent in the aqueous electrolyte, wherein water is the only solvent, at a concentration equal to, or greater than, 0.001 weight percent (wt %) to less than 5 wt %.

2. The aqueous electrolyte of claim 1, wherein $R^2$ is selected from the group consisting of hydrogen, —OH, —$C_{1-6}$alkyl-C(O)OR$^6$, $C_{6-10}$aryl, $C_{6-10}$aryloxy, and $C_{6-10}$aryl$C_{1-6}$alkoxy, wherein the $C_{6-10}$aryl, either alone or as part of another group, is optionally substituted with at least one $R^7$; and $R^3$ is hydrogen or $C_{1-6}$alkyl.

3. The aqueous electrolyte of claim 1, wherein $R^3$ is hydrogen.

4. The aqueous electrolyte of claim 1, wherein $R^2$ is selected from hydrogen or —OH.

5. The aqueous electrolyte of claim 1, wherein the electrolyte additive is of the formula:

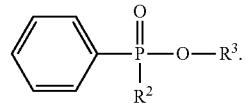

6. The aqueous electrolyte of claim 5, wherein the electrolyte additive is of the formula:

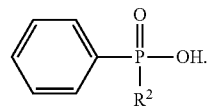

7. The aqueous electrolyte of claim 6, wherein $R^2$ is selected from the group consisting of hydrogen, —OH, and —$C_{1-6}$alkyl-C(O)OR$^6$.

8. The aqueous electrolyte of claim 6, wherein $R^2$ is hydrogen or —OH.

9. The aqueous electrolyte of claim 1, wherein the electrolyte comprises the cation K$^+$.

10. The aqueous electrolyte of claim 1, wherein the electrolyte additive is selected from the group consisting of

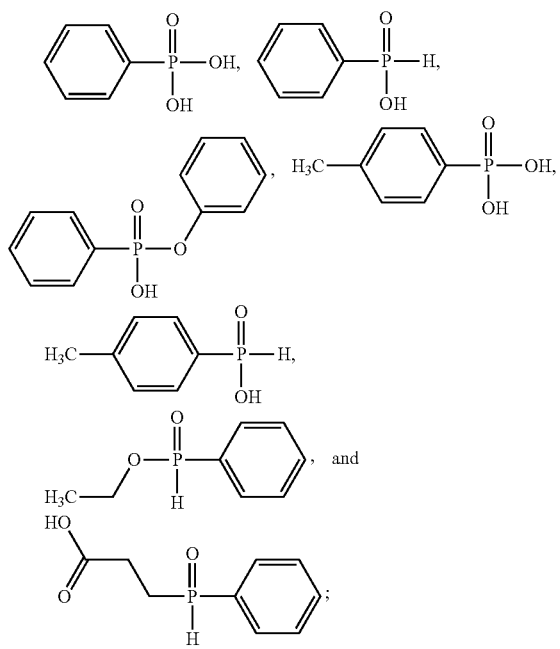

or a salt thereof, an anion thereof, a hydrolytic product thereof, or an electrochemical reduction product thereof.

11. The aqueous electrolyte of claim 1, wherein the electrolyte additive is selected from the group consisting of

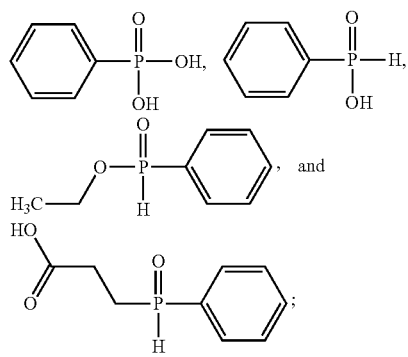

or a salt thereof, an anion thereof, a hydrolytic product thereof, or an electrochemical reduction product thereof.

12. The aqueous electrolyte of claim 11, wherein the electrolyte additive is

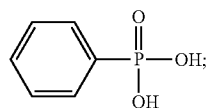

or a salt thereof, an anion thereof, a hydrolytic product thereof, an electrochemical reduction product thereof, or a combination thereof.

13. The aqueous electrolyte of claim 11, wherein the electrolyte additive is

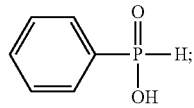

or a salt thereof, an anion thereof, a hydrolytic product thereof, an electrochemical reduction product thereof, or a combination thereof.

14. The aqueous electrolyte of claim 11, wherein the electrolyte additive is

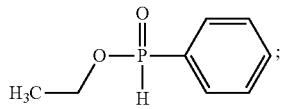

or a salt thereof, an anion thereof, a hydrolytic product thereof, an electrochemical reduction product thereof, or a combination thereof.

15. The aqueous electrolyte of claim 11, wherein the electrolyte additive is

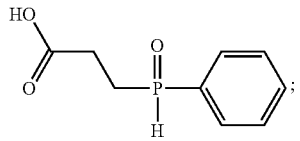

or a salt thereof, an anion thereof, a hydrolytic product thereof, an electrochemical reduction product thereof, or a combination thereof.

16. The aqueous electrolyte of claim 1, wherein the electrolyte additive or combination of electrolyte additives is present in the aqueous electrolyte at a concentration equal to, or greater than, about 0.001 wt % to less than, or equal to, 1 wt %.

17. The aqueous electrolyte of claim 1, wherein the electrolyte additive or combination of electrolyte additives is present in the aqueous electrolyte at a concentration equal to, or greater than, about 0.001 wt % to less than, or equal to, 0.5 wt %.

18. The aqueous electrolyte of claim 1, wherein the electrolyte additive or combination of electrolyte additives is present in the aqueous electrolyte at a concentration equal to, or greater than, about 0.01 wt % to less than, or equal to, 0.5 wt %.

19. The aqueous electrolyte of claim 1, wherein the electrolyte additive or combination of electrolyte additives is present in the aqueous electrolyte at a concentration equal to, or greater than, about 0.1 wt % to less than, or equal to, 0.5 wt %.

20. An electrochemical cell comprising an anode wherein the anode is zinc; a cathode selected from the group consisting of oxygen, lithium, carbon, cerium, chloride, bromide, iodide, iron, manganese dioxide, nickel, and silver oxide; and an aqueous electrolyte of claim 1.

* * * * *